(12) United States Patent
Lin et al.

(10) Patent No.: US 10,193,329 B2
(45) Date of Patent: Jan. 29, 2019

(54) WAVE-MAKING MECHANISM

(71) Applicant: Intex Marketing Ltd., Tortola (VG)

(72) Inventors: Hua Hsiang Lin, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 15/958,683

(22) Filed: Apr. 20, 2018

(65) Prior Publication Data

US 2018/0309282 A1 Oct. 25, 2018

Related U.S. Application Data

(62) Division of application No. 14/629,758, filed on Feb. 24, 2015, now Pat. No. 9,979,182.

(30) Foreign Application Priority Data

| Feb. 24, 2014 | (CN) | 2014 2 0077794 U |
| Feb. 24, 2014 | (CN) | 2014 2 0077997 U |
| Mar. 18, 2014 | (CN) | 2014 2 0121353 U |
| Mar. 25, 2014 | (CN) | 2014 2 0136817 U |

(51) Int. Cl.
*E04H 4/00* (2006.01)
*H02H 7/08* (2006.01)
(Continued)

(52) U.S. Cl.
CPC ......... *H02H 7/0833* (2013.01); *E04H 4/0006* (2013.01); *F16M 11/046* (2013.01); *F16M 13/02* (2013.01); *H01M 10/425* (2013.01); *H01M 10/46* (2013.01); *H02H 3/087* (2013.01); *H02H 5/041* (2013.01); *H02J 7/0034* (2013.01); *E04H 4/0056* (2013.01); *H01M 2220/10* (2013.01)

(58) Field of Classification Search
CPC .......................... E04H 4/0006; A63B 69/125
See application file for complete search history.

(56) References Cited

U.S. PATENT DOCUMENTS

| 1,630,797 A | 5/1927 | Marwick |
| 3,476,106 A | 11/1969 | Ritz et al. |

(Continued)

FOREIGN PATENT DOCUMENTS

| DE | 3408217 | 9/1985 |
| EP | 0614684 | 9/1994 |

OTHER PUBLICATIONS

Endless Pools, "Fastlane Pool: Cost effective and easy to install for a quality swim, year-round," available at http://www.endlesspools.com/fastlane-pool.php at least as early as Dec. 18, 2014, 1 page.

*Primary Examiner* — Janie Loeppke
(74) *Attorney, Agent, or Firm* — Faegre Baker Daniels LLP

(57) ABSTRACT

A mounting rack for supporting a wave-making mechanism in a pool includes a connecting bracket coupled to a side wall of the pool. The connecting bracket includes a support bracket with an adjustable opening configured to receive an upper portion of the pool and at least one connecting bar configured for vertical adjustment along the side wall of the pool. The mounting rack further includes a suspension bracket operably coupled to the connecting bracket and configured to support the wave-making mechanism in the pool, and a bottom surface of the wave-making mechanism is generally parallel to a bottom surface of the pool.

8 Claims, 26 Drawing Sheets

(51) Int. Cl.
*H02H 3/087* (2006.01)
*H02H 5/04* (2006.01)
*F16M 11/04* (2006.01)
*H01M 10/46* (2006.01)
*H01M 10/42* (2006.01)
*F16M 13/02* (2006.01)
*H02J 7/00* (2006.01)

(56) References Cited

U.S. PATENT DOCUMENTS

| | | | |
|---|---|---|---|
| 3,534,413 | A | 10/1970 | Plasseraud |
| 4,115,878 | A | 9/1978 | Johnson et al. |
| 4,352,215 | A | 10/1982 | Laing |
| 4,375,337 | A | 3/1983 | Yerger |
| 4,379,438 | A | 4/1983 | Peardon |
| 4,420,846 | A | 12/1983 | Bonner |
| 4,502,168 | A | 3/1985 | Jaworski |
| 4,523,340 | A | 6/1985 | Watkins |
| 4,525,881 | A | 7/1985 | Higginbotham |
| 4,561,133 | A | 12/1985 | Laing |
| 4,665,572 | A | 5/1987 | Davidson et al. |
| 4,731,887 | A | 3/1988 | Henkin et al. |
| 4,763,366 | A | 8/1988 | Moreland |
| 4,773,104 | A | 9/1988 | Wang |
| 4,780,917 | A | 11/1988 | Hancock |
| 4,843,659 | A | 7/1989 | Popovich et al. |
| 4,845,787 | A | 7/1989 | Lior |
| 4,853,987 | A | 8/1989 | Jaworski |
| 4,903,352 | A | 2/1990 | Murakami |
| 4,907,304 | A | 3/1990 | Davidson et al. |
| 4,920,588 | A | 5/1990 | Watkins |
| 5,005,228 | A | 4/1991 | Mermelstein |
| 5,044,021 | A | 9/1991 | Murdock |
| 5,095,558 | A | 3/1992 | Howard |
| 5,167,041 | A | 12/1992 | Burkitt, III |
| 5,172,754 | A | 12/1992 | Graber et al. |
| 5,226,408 | A | 7/1993 | Drysdale |
| 5,291,621 | A | 3/1994 | Mathis |
| 5,298,003 | A | 3/1994 | Weihe et al. |
| 5,379,467 | A | 1/1995 | Lochbaum |
| 5,408,708 | A | 4/1995 | Mathis |
| 5,495,627 | A | 3/1996 | Leaverton et al. |
| 5,570,481 | A | 11/1996 | Mathis et al. |
| 5,597,288 | A | 1/1997 | Hatanaka |
| 5,662,557 | A | 9/1997 | Watterson et al. |
| 5,662,558 | A | 9/1997 | Shannon, III |
| 5,758,369 | A | 6/1998 | Takahashi et al. |
| 5,862,543 | A | 1/1999 | Reynoso et al. |
| 5,915,849 | A | 6/1999 | Dongo |
| 5,920,925 | A | 7/1999 | Dongo |
| 5,983,416 | A | 11/1999 | Idland |
| 6,000,073 | A | 12/1999 | Eddington |
| 6,009,574 | A | 1/2000 | Moreland |
| 6,030,180 | A | 2/2000 | Clarey et al. |
| 6,065,161 | A | 5/2000 | Mateina et al. |
| 6,123,274 | A | 9/2000 | Perdreau et al. |
| 6,165,358 | A | 12/2000 | Denkewicz, Jr. et al. |
| 6,233,754 | B1 | 5/2001 | Ajima |
| 6,263,522 | B1 | 7/2001 | Dongo et al. |
| 6,454,523 | B1 | 9/2002 | Loyd et al. |
| 6,578,207 | B1 | 6/2003 | Fratilla |
| 6,592,341 | B1 | 7/2003 | Olney |
| 6,675,404 | B2 | 1/2004 | Brennan et al. |
| 6,688,845 | B2 | 2/2004 | Páges Páges |
| 6,692,645 | B1 | 2/2004 | Gargas |
| 6,789,278 | B2 | 9/2004 | Shea |
| 6,797,164 | B2 | 9/2004 | Leaverton |
| 6,857,967 | B2 | 2/2005 | Loyd et al. |
| 6,859,953 | B1 | 3/2005 | Christensen |
| 6,968,581 | B2 | 11/2005 | Christensen |
| 7,001,159 | B2 | 2/2006 | Peterson, Jr. et al. |
| 7,067,056 | B2 | 6/2006 | Collins |
| 7,252,761 | B2 | 8/2007 | Lamberts Van Assche |
| 7,493,665 | B2 | 2/2009 | Williams |
| 7,526,820 | B2 | 5/2009 | Murdock et al. |
| 7,531,092 | B2 | 5/2009 | Hazlehurst |
| 7,712,161 | B2 | 5/2010 | Reynolds, II |
| 7,818,826 | B2 | 10/2010 | Schmidt et al. |
| 7,984,519 | B1 | 7/2011 | Hall |
| 8,011,032 | B2 | 9/2011 | Cline et al. |
| 8,104,110 | B2 | 1/2012 | Caudill et al. |
| 8,141,180 | B2 | 3/2012 | Hof |
| 8,186,517 | B2 | 5/2012 | Bowman et al. |
| 8,214,936 | B2 | 7/2012 | Thweatt, Jr. |
| 8,453,275 | B2 | 6/2013 | May et al. |
| 8,607,372 | B2 | 12/2013 | Hall |
| 8,689,370 | B2 | 4/2014 | Fleischer |
| 8,702,387 | B2 | 4/2014 | Gillette |
| 8,739,322 | B2 | 6/2014 | Hof |
| 8,907,616 | B2 | 12/2014 | Liu et al. |
| 2003/0200604 | A1 | 10/2003 | Loyd et al. |
| 2004/0040908 | A1 | 3/2004 | Orava et al. |
| 2004/0148693 | A1 | 8/2004 | Anderson |
| 2006/0021129 | A1 | 2/2006 | Williams et al. |
| 2006/0124535 | A1 | 6/2006 | Harbol |
| 2006/0137087 | A1 | 6/2006 | Carreau et al. |
| 2006/0226060 | A1 | 10/2006 | Mercer |
| 2006/0282943 | A1 | 12/2006 | Vandecamp |
| 2007/0039876 | A1 | 2/2007 | Gori |
| 2007/0094784 | A1 | 5/2007 | Tran |
| 2007/0214560 | A1 | 9/2007 | Chivers et al. |
| 2008/0016610 | A1 | 1/2008 | Kuo et al. |
| 2008/0086810 | A1 | 4/2008 | Le |
| 2008/0148470 | A1 | 6/2008 | Ferriss et al. |
| 2009/0100589 | A1 | 4/2009 | Peterson, Jr. et al. |
| 2009/0133766 | A1 | 5/2009 | Elnar |
| 2009/0158518 | A1 | 6/2009 | Southon et al. |
| 2010/0058528 | A1 | 3/2010 | Clarey |
| 2010/0064428 | A1 | 3/2010 | Loyd et al. |
| 2010/0269251 | A1 | 10/2010 | DeMotts |
| 2011/0004993 | A1 | 1/2011 | Frei |
| 2011/0247970 | A1 | 10/2011 | Evingham |
| 2011/0253638 | A1 | 10/2011 | Easland et al. |
| 2012/0090087 | A1 | 4/2012 | Korupp et al. |
| 2012/0117724 | A1 | 5/2012 | Caudill et al. |
| 2013/0031711 | A1 | 2/2013 | Walsh et al. |
| 2013/0034430 | A1 | 2/2013 | Braswell |
| 2013/0145539 | A1 | 6/2013 | Cooke |
| 2013/0334113 | A1 | 12/2013 | Erlich |
| 2014/0047632 | A1 | 2/2014 | Hall |
| 2014/0101840 | A1 | 4/2014 | Harder |
| 2014/0331398 | A1 | 11/2014 | Walsh et al. |

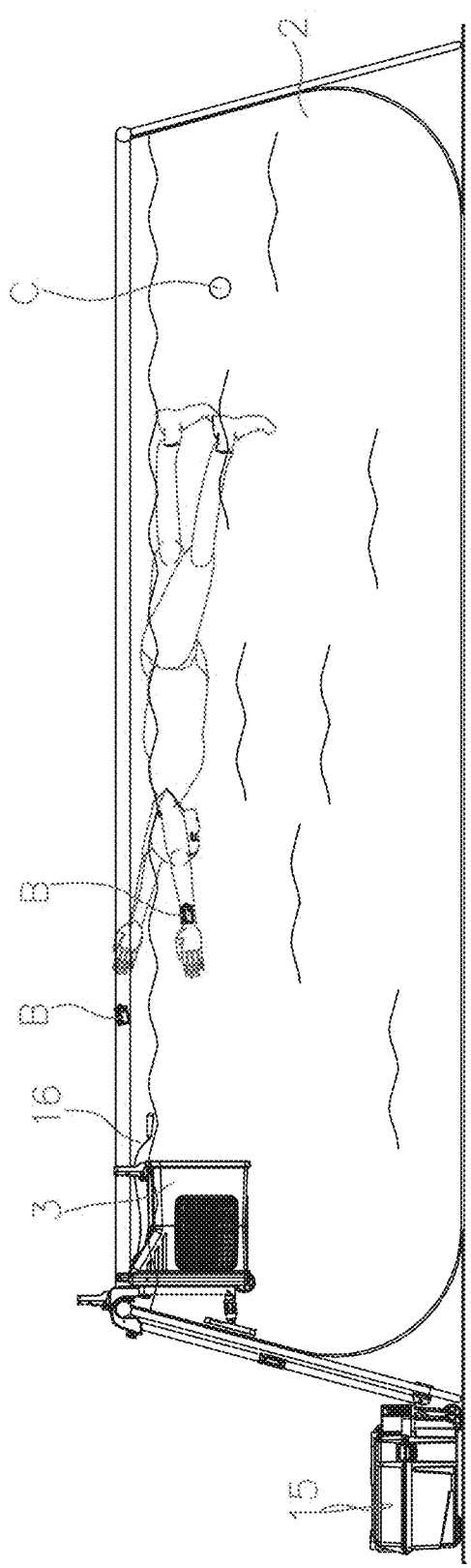

WAVE-MAKING MECHANISM

CROSS-REFERENCE TO RELATED APPLICATIONS

The present application is a division of U.S. patent application Ser. No. 14/629,758, filed Feb. 24, 2015, and claims priority to Chinese Patent Application No. 201420077997.6, filed on Feb. 24, 2014, and entitled "A WAVEMAKING MECHANISM FOR A POOL"; Chinese Patent Application No. 201420077794.7, filed on Feb. 24, 2014, and entitled "A MOUNTING RACK OF A WAVE-MAKING MACHINE"; Chinese Patent Application No. 201420121353.2, filed on Mar. 18, 2014, and entitled "ANTI-REVERSE BATTERY DEVICE"; and Chinese Patent Application No. 201420136817.7, filed on Mar. 25, 2014, and entitled "CONTROL CIRCUIT OF THE WAVE-MAKING MACHINE", the complete disclosures of which are expressly incorporated by reference herein.

BACKGROUND OF THE DISCLOSURE

The present invention relates generally to a wave-making mechanism, and, more particularly, to a wave-making mechanism for a pool or spa.

Above-ground pools are typically used for recreation and other personal use, however, the size and shape of an above-ground pool may not allow for exercise or other activities within the pool. Additionally, pools with moving water, such as a wave effect or a river current, may only appear in large entertainment parks, such as recreational water parks, because these pools use a pressure pump in the pool wall to drive or propel the water, thereby achieving the effect of moving water (e.g., a wave effect or a river current effect).

Additionally, the pressure pump for creating the moving water effect in the pool is supported on the pool structure and, as such, the configuration of the pool structure is such that the pressure pump may be supported on a pool side wall or other structure.

Furthermore, pools for personal use, such as an above-ground or in-ground pool or a spa, may include a jet or nozzle configured to flow a small amount of water. However, the jets or nozzles may not include a pump configured to output a high volume flow of water necessary to create a wave effect or simulate the flow or current of a river.

SUMMARY OF THE DISCLOSURE

To achieve a high volume flow of water and create a wave effect or simulate a river current, a wave-making mechanism may be provided which may comprise a control circuit operably coupled to a motor and an impeller. The control circuit may include a starting circuit, at least one microchip or similar electronic chip device, and a drive circuit operably coupled to a motor of the wave-making mechanism. The starting circuit may transmit an initiation or trigger signal to actuate the at least one chip and output a pulse width modulation ("PWM") drive signal. The PWM drive signal may then transmit a signal to the drive circuit to actuate the motor. The motor is configured to operate the wave-making component to effect the flow of the water in a pool, thereby creating a wave effect or simulating the current of a river.

The control circuit may further comprise a power circuit whereby if the motor does not operate as intended, the power circuit ceases operation of the motor to protect the motor from burning out. The control circuit may be configured to output various PWM drive signals such that a user can select different effects in the water. For example, if the user selects a lower speed output, the effect may be a simulation of a water current in a river. Conversely, if the user selects a higher speed output, the effect may be a simulation of a wave in the water. Each of the various PWM drive signals includes an independent power circuit for proper operation of the wave-making mechanism.

Rechargeable batteries may be used to operate all or a portion of the wave-making mechanism. Rechargeable batteries may decrease the likelihood of pollution to the environment caused by batteries. Rechargeable batteries operate with a battery recharger, however, reverse charging may occur which can damage the rechargeable batteries. More particularly, reverse charging occurs when a discharged battery cell receives current in the direction of discharging, rather than in the direction of charging. If a rechargeable battery is subjected to reverse charging, the rechargeable batteries may break or burst. Therefore, battery chargers may include an anti-reverse functionality such that if the batteries are incorrectly positioned within the battery charger, the negative electrode of the battery does not contact to the positive electrode of the battery charger. As such, the battery charger does not cause reverse charging to occur.

In one embodiment of the present disclosure, a mounting rack for supporting a wave-making mechanism in a pool includes a connecting bracket coupled to a side wall of the pool. The connecting bracket includes a support bracket with an adjustable opening configured to receive an upper portion of the pool and at least one connecting bar configured for vertical adjustment along the side wall of the pool. The mounting rack further includes a suspension bracket operably coupled to the connecting bracket and configured to support the wave-making mechanism in the pool, and a bottom surface of the wave-making mechanism is generally parallel to a bottom surface of the pool.

In a further embodiment of the present disclosure, a wave-making mechanism of a pool comprises a housing with inlet holes distributed in a rear portion and a plurality of side walls, a motor positioned within the housing, an external power supply operably coupled to the motor, a motor control box operably connected to the external power supply, an impeller driven by the motor, an impeller housing covering the impeller and including rectifying holes, a guiding cap coupled to a front end of the impeller housing and having a flared configuration, an outlet cover coupled to a front end of the guiding cap and including a screen portion, and a shut-off switch that comprises a switch head magnetically coupled to the housing and including a handle and a cord.

In another embodiment of the present disclosure, a control circuit for controlling a motor of a wave-making mechanism comprises a starting circuit, a single chip electronically associated with the starting circuit, a driving circuit electronically associated with the single chip, and an abnormal condition protection circuit to control power of the motor. The abnormal condition protection circuit comprises an abnormal condition signal input circuit, a third lock and shield circuit, a first drive triode, and a first relay. A normal open contact of the first relay is electronically coupled to the motor. The control circuit further comprises an over-current protection circuit to control power of a work circuit of the motor. The over-current protection circuit comprising a PWM convert reference voltage circuit, a comparator, a first lock and shield circuit, a second lock and shield circuit, and a signal amplifying circuit. An input of the single amplifying circuit is connected to a current feedback point of the work circuit of the motor. An output of the PWM convert reference voltage circuit is connected to a PWM drive signal output of the single chip. An output of the PWM convert reference voltage circuit is connected to an inverting input of the comparator. An output of the comparator is electronically connected to an input of the first lock and shield circuit and the second lock and shield circuit, and an output of the first lock and shield circuit and a drive output of the single chip is electronically connected to the drive input of the second relay drive circuit. The normal open contact of the second relay of the second relay drive circuit is electronically connected to the work circuit of the motor, and the output of the second lock and shield circuit is connected to a drive port of the drive circuit.

In a further embodiment of the present disclosure, an anti-reverse battery device for a wave-making mechanism configured to be positioned within a pool comprises at least one rechargeable battery coupled in series to at least one single-pole double-throw relay, a battery reverse anti-charging circuit, a first lock and shield circuit. The battery reverse anti-charging circuit and the first lock and shield circuit are electronically connected between a discharge power and a power drive port of the at least one single-pole double-throw relay, and the first lock and shield circuit outputs a control signal to cut off a drive power of the at least one single-pole double-throw relay to prevent charging the at least one rechargeable battery when an orientation of the rechargeable battery is reversed.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 1B is a cross-sectional view of the illustrative pool and wave-making mechanism of FIG. 1;

Figure 1:
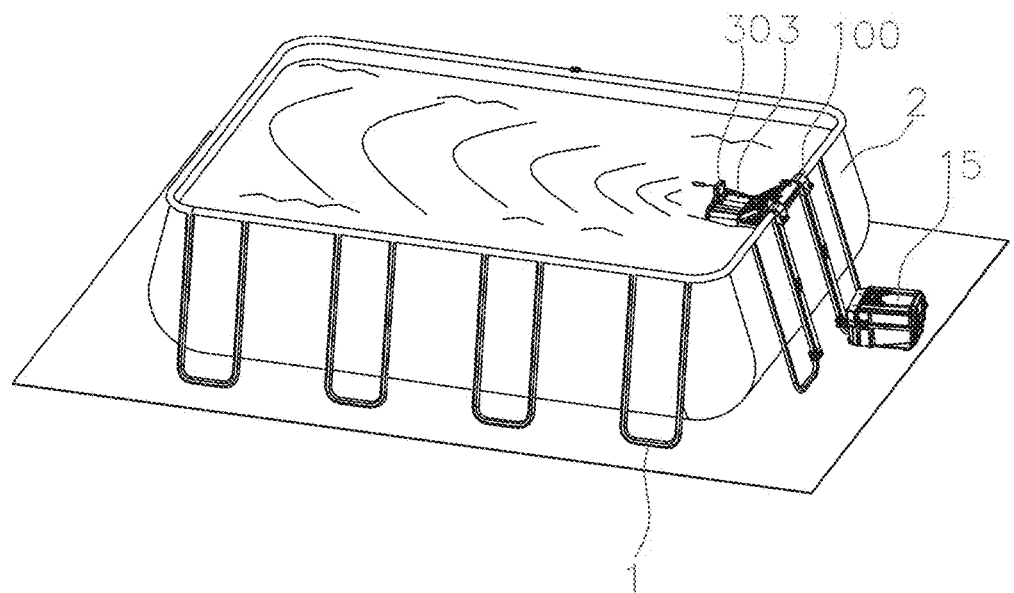
FIG. 1 is a side perspective view of an illustrative pool and a wave-making mechanism of the present disclosure.
Figure 1A:
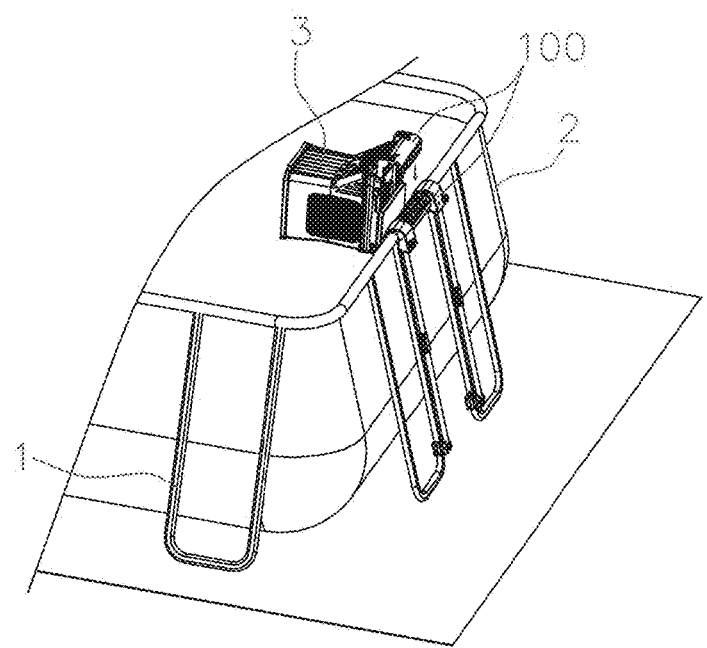
FIG. 1A is a detailed perspective view of the wave-making mechanism of FIG. 1.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

As can be seen from FIGS. 1-4, a wave-making mechanism 3 for use with a spa or pool 2 is shown. The illustrative pool 2 is an above-ground pool supported on a ground surface with a support frame 1. The side walls of the pool may be comprised of solid materials or may be configured to inflate with air. Alternatively, pool 2 may be an in-ground pool.

Figure 2:
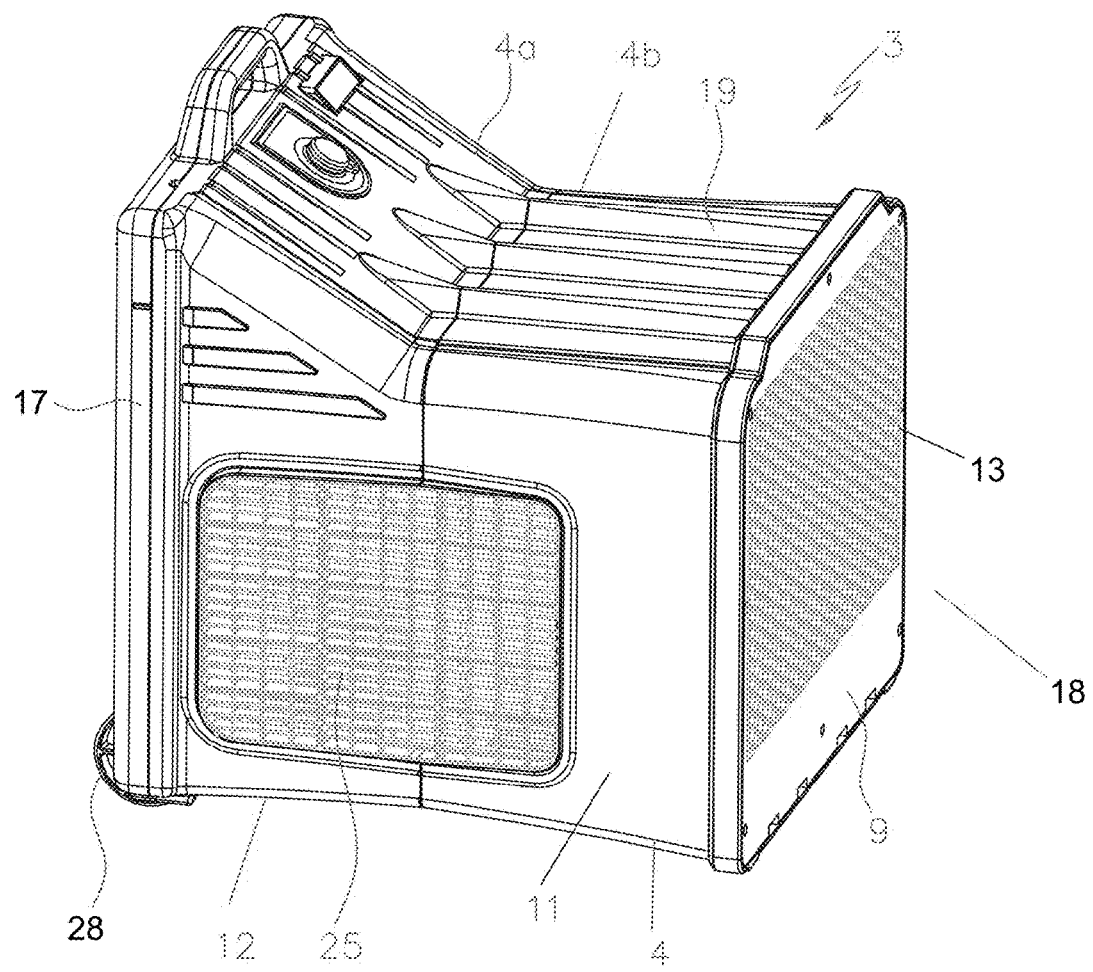
FIG. 2 is a side perspective view of the wave-making mechanism of FIG. 1.
Figure 3:
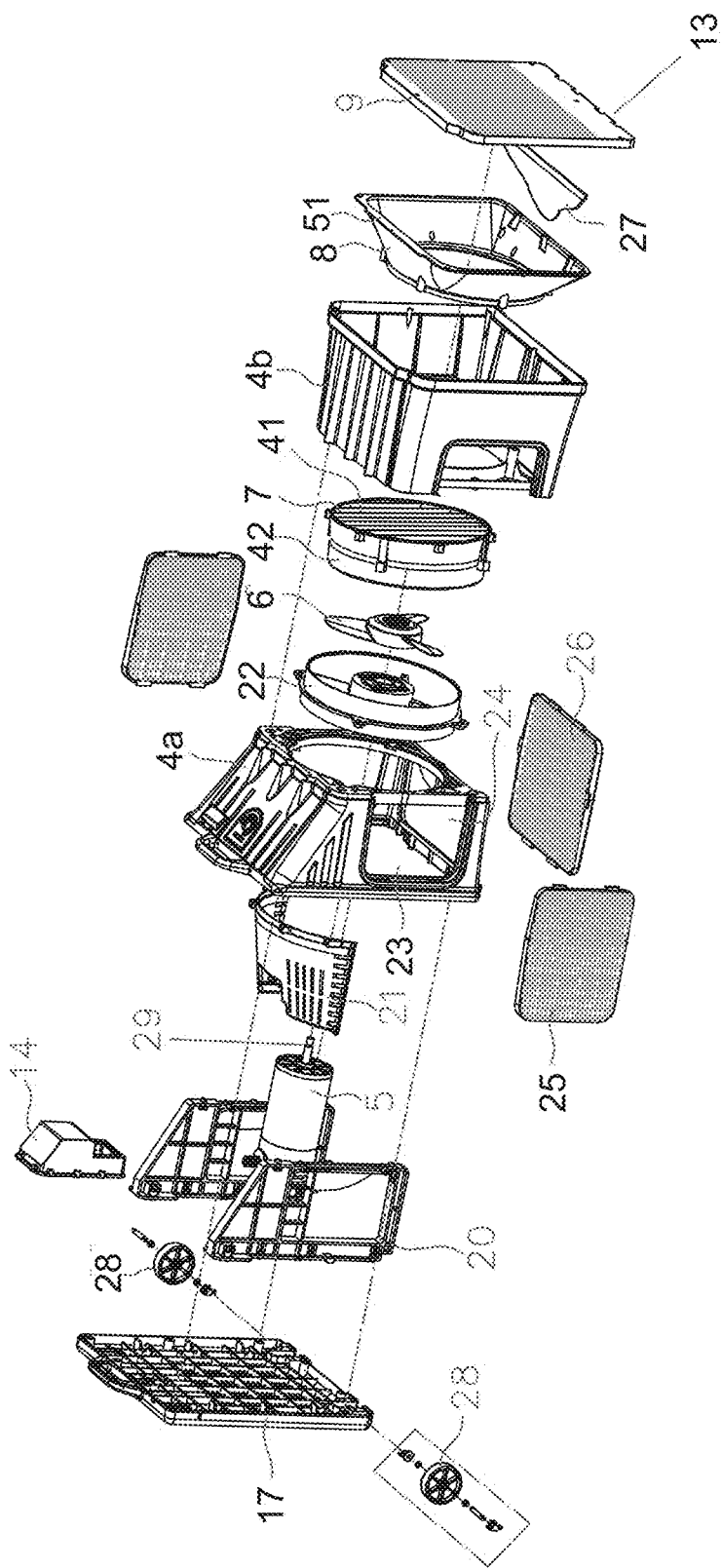
FIG. 3 is an exploded view of the wave-making mechanism of FIG. 2.
Figure 4:
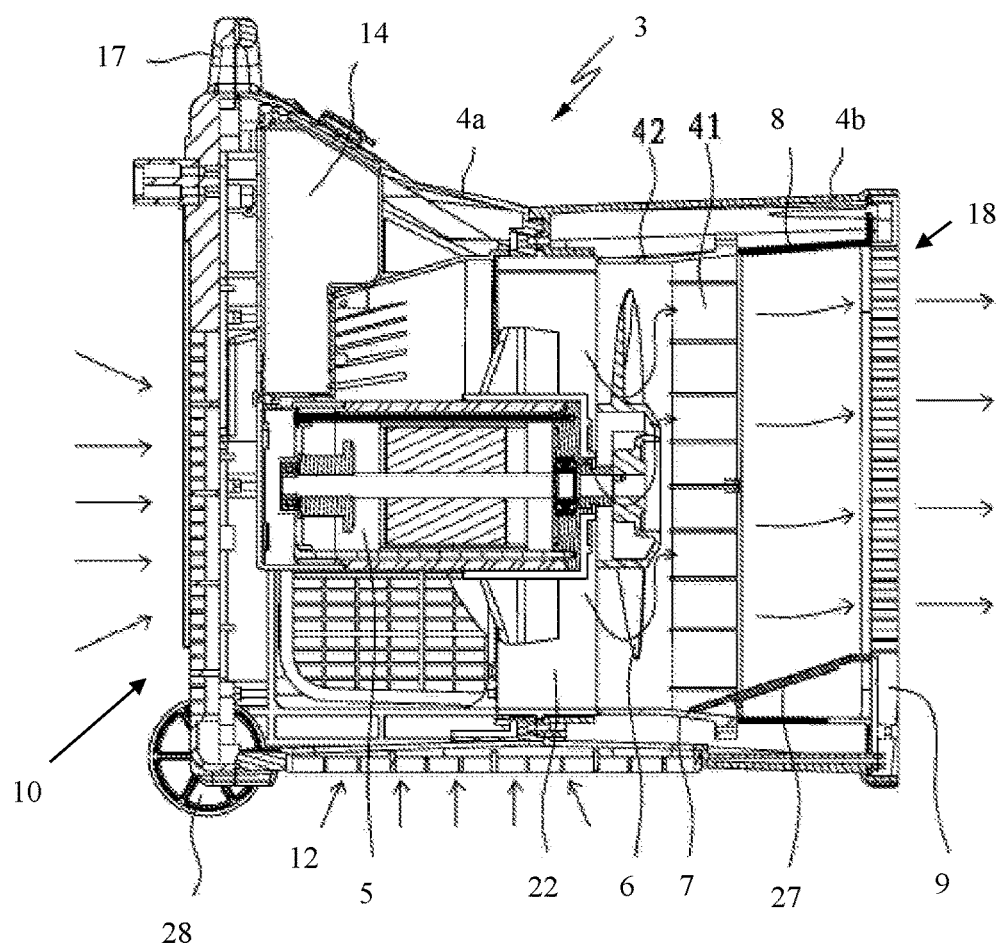
FIG. 4 is a cross-sectional view of the wave-making mechanism of FIG. 2.

Referring to FIGS. 2-4, the wave-making mechanism 3 comprises a housing 4 having a front housing cover or member 4b, a rear housing cover or member 4a, a motor 5 supported by the housing 4, an impeller or impeller 6 driven by the motor 5, an impeller housing 7 for supporting impeller 6 has a rectifying slot arrangement, a guiding cap or shroud 8 coupled to the front end of the impeller housing 7 and having a diverging diffuser outlet, and an outlet cover 9 coupled to the front end of the guiding cap 8. For convenient movement of the wave-making mechanism 3, movable rollers 28 may be rotatably coupled to the bottom of the housing 4.

As shown in FIG. 3, the impeller housing 7 and the guiding cap 8 are coupled to front housing member 4b. The front edge of the guiding cap 8 defines a flange 51 for locking the front edge thereof to front housing member 4b. The impeller housing 7 is formed with grid rectifying holes 41 at the diverging diffuser outlet and the guiding cap 8 has a flared or angled configuration. A rear end of the guiding cap 8 is coupled to the front end of the impeller housing 7 and extends forwardly in the flared configuration which tapers inwardly in a rearward direction. Additionally, outlet cover 9 is coupled to the front edge of the front housing member 4b. The outlet cover 9 is configured as grid board with a plurality of apertures 13.

Referring to FIGS. 2-4, a plurality of inlet holes 10 are distributed in a rear portion 17 of the housing 4. In addition to the rear portion 17, the housing 4 also includes a front portion 18, a top wall 19, two side walls 11 and bottom wall 12. Side walls 11 and bottom wall 12 include openings 23 and 24, respectively. Positioned within openings 23 and 24 are inlet screen covers 25 and 26, respectively, which have a mesh or grid configuration that include a plurality of apertures.

As shown in FIGS. 3 and 4, to direct and guide the flow of fluid in the flowing direction through the wave-making mechanism 3, a directional baffle 27 is disposed between the guiding cap 8 and the outlet cover 9. The guiding baffle 27 is assembled at the lower portion of the guiding cap 8 and the outlet cover 9, and it inclines vertically from the rear to the front relative to the water surface (i.e., the baffle 27 is angled upwardly in a forward direction).

Referring to FIG. 3, the impeller housing 7 further defines a cover 42 coupled to a motor support 22, which together, generally surround impeller 6. The motor support 22 is coupled to the front housing member 4b and is coupled to the front portion of the motor 5. A rotating shaft 29 of the motor 5 is coupled to the impeller 6 through the motor support 22.

Referring to FIGS. 3 and 4, to control wave-making mechanism 3, a motor control box 14 is mechanically, electronically, magnetically, or otherwise connected to an external power supply 15 (FIG. 1) and is operably coupled to the motor 5. The external power supply 15 includes a battery assembly having at least one battery and, more particularly, having at least on rechargeable battery. The motor control box 14 and the motor 5 may be supported by a motor frame 20. Additionally, a motor cover 21 may be provided to inhibits a whirlpool effect on the water surface if the wave-making mechanism 3 is not positioned deep enough within the water of the pool 2. More particularly, if the wave-making mechanism 3 is not positioned deep enough in the water, the motor cover 21 inhibits formation of a whirlpool in the water because air from the surface of the water is drawn through the impeller 6 and the motor cover 21 effectively increases the distance the motor impeller 6 is positioned in the water, thereby decreasing the likelihood that suction will occur.

Figure 5:
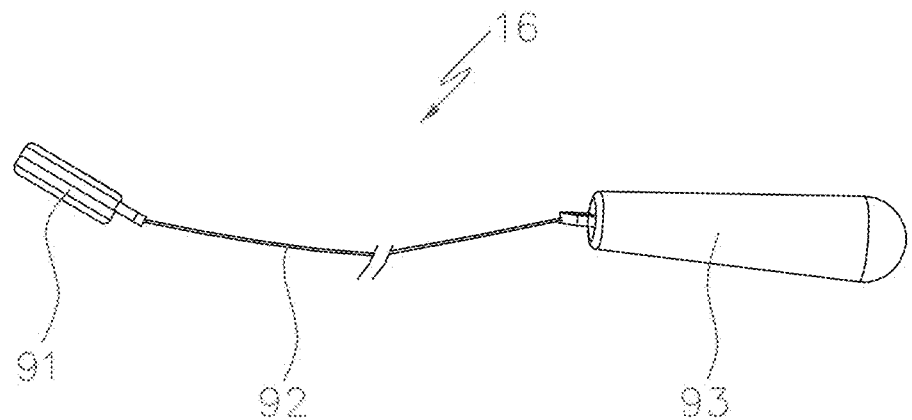
FIG. 5 is a schematic side perspective view of a shut-off device including a cord.

Referring to FIG. 5, the housing 4 of the wave-making mechanism 3 may be configured with a shut-off device 16 that comprises a switch head 91 which may include a magnet (not shown). The magnet allows the shut-off device 16 to be magnetically coupled to a portion of the pool 2 and/or the wave-making mechanism 3. Shut-off device 16 also includes a cord 92 and a handle 93 which are floatable in water. A user may pull on the handle 93 to abruptly stop operation of the wave-making mechanism 3.

Figure 6:
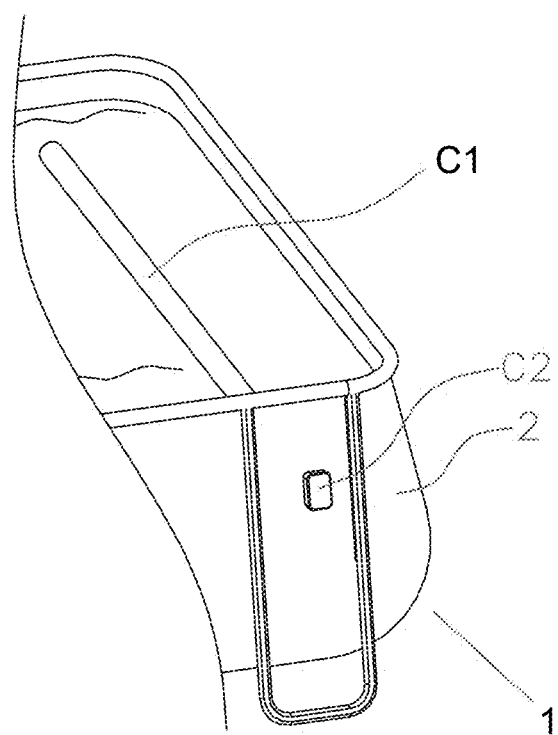
FIG. 6 is a schematic perspective view of a further embodiment of a shut-off device.

Additionally, as shown in FIGS. 1B and 6, a float shut-off switch C may be positioned at the opposite end of the pool 2 from the wave-making mechanism 3. The motor control box 14 may be disposed with a sensor (not shown) mechanically, electronically, or otherwise coupled to float shut-off switch C. The float shut-off switch C comprises a float pipe C1 floatable in the water of the pool 2 and a sensor C2 which may be positioned at the outer wall of the pool 2. If the user wishes to abruptly stop operation of the wave-making mechanism 3 (e.g., in the event of an emergency), the user touches the float pipe C1 which mechanically, electrically, magnetically, or otherwise activates the sensor C2 to turn off the wave-making mechanism 3. More particularly, the location of the float pipe C1 within the pool 2 is positioned such that the user will be able to easily contact the float pipe C1 to turn off the wave-making mechanism 3 but the float pipe C1 will not hinder the user's activity in the pool 2.

Referring to FIGS. 1-6, in operation, the wave-making mechanism 3 is coupled to a side wall of the pool 2 relative to the water surface and, illustratively, below the water surface. The motor control box 14 may then be actuated to start the motor 5 which drives the impeller 6. As the impeller 6 rotates, the impeller 6 draws water into the housing 4 through the inlet holes 10 at the rear portion 17 and through the inlet screen covers 25, 26 in the side walls 11 and bottom wall 12, respectively, of the housing 4. During operation, when water passes through impeller 6, a forwardly rotating flow is formed. Additionally, when the rotating water passes through the grid holes 41 of the impeller housing 7, the rotating water flows in a forward direction toward the center of the pool 2. The water then passes through the guiding cap 8 and through the outlet cover 9. By passing through the apertures 13 in the outlet cover 9, the water is evenly distributed into the pool 2, so that the still water surface in the pool 2 begins to move. For example, the flow of water into the pool 2 may create the effect of a moving river current or a wave effect whereby users can swim, jog, or play in the pool 2 while maintaining the same position within the pool (e.g., the user may swim in a same place).

Referring to FIG. 5, when the wave-making mechanism 3 is operating, the switch head 91 of the shut-off device 16 is attached to the housing 4 and/or the pool 2. If the user needs to abrupt stop operation of the wave-making mechanism 3 (e.g., if an emergency situation occurs), the switch head 91 can be pulled to stop the machine. More particularly, the user may pull on the handle 93 which transmits the user's signal through the cord 92 to the switch head 91, thereby triggering the signal to stop operation of the wave-making mechanism 3. Additionally, the user may also touch float pipe C1 (FIG. 6) to stop operation of the wave-making mechanism 3.

Referring to FIG. 1B, for convenient operation of the wave-making mechanism 3, a remote controller B may be provided. The remote controller B is movably attached to any position of the pool 2 or, alternatively, the remote controller B can be worn on the user. For example, the user may wear the remote controller B on his/her wrist similar to wearing a watch. Either at the wave-making mechanism 3 or by way of the remote controller B, the user may adjust the strength of the moving water flowing from the wave-making mechanism 3 to adjust the effect of the wave-making mechanism 3 from a slow river current effect to a strong wave effect. As such, the user can swim upstream, jog in place in the pool 2, etc. A display panel 30 (FIG. 1) may be provided on the wave-making mechanism 3 to alert the user to the various settings and operational parameters of the wave-making mechanism 3.

Figure 7:
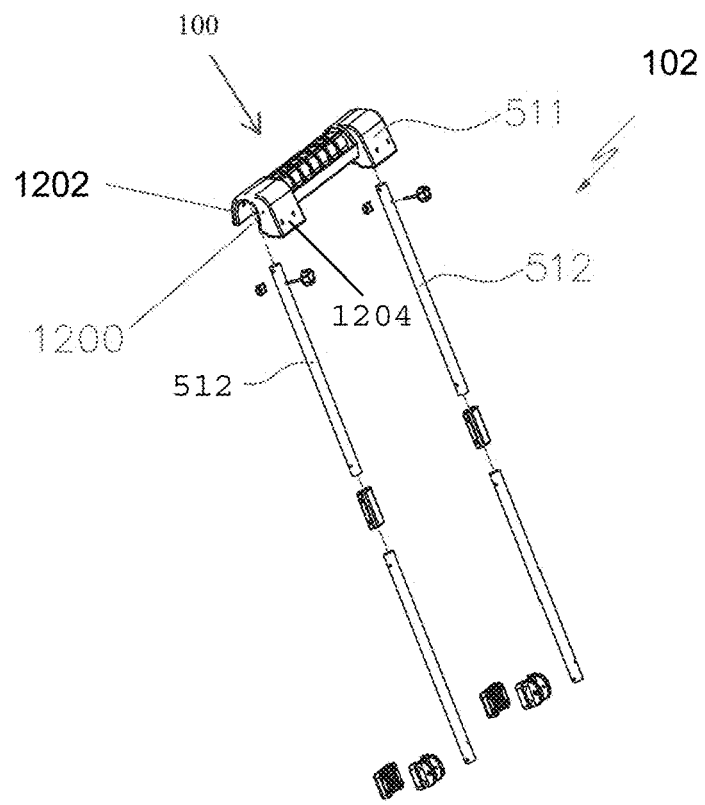
FIG. 7 is an exploded view of a mounting rack for supporting the wave-making mechanism of FIG. 2.
Figure 8:
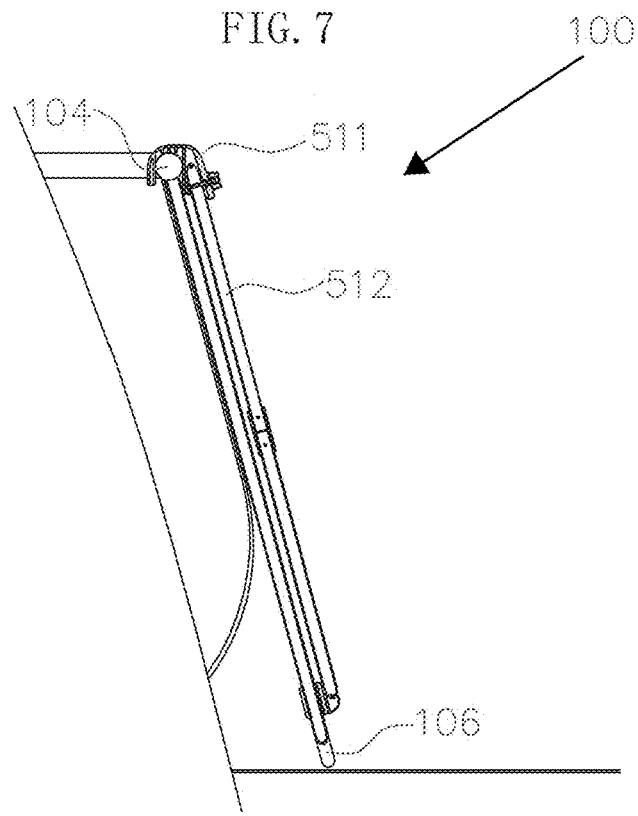
FIG. 8 is a side view of the mounting rack of FIG. 7.

Referring to FIGS. 7-20, the wave-making mechanism 3 is coupled to the pool 2 with a mounting rack 100. The mounting rack 100 comprises a connecting bracket 102 coupled to the pool 2 and a suspension bracket 52 coupled to the wave-making mechanism 3. As shown in FIGS. 7 and 8, the connecting bracket 102 comprises a support bracket 511 to fasten to a horizontal pipe 104 of the support frame 1 at the top end of the pool 2. More particularly, support bracket 511 includes adjustable panels 1202, 1204 which define an adjustable opening 1200 with a varying diameter because the panels 1202, 1204 can expand and contract to attach to horizontal pipes 104 of the pool 2 with varying diameters. In this way, mounting bracket 100 is configured to couple with a pool of any size.

Additionally, mounting bracket 100 includes two connecting bars 512 which are movably connected to a vertical bar 106 of the support frame 1. The connecting bars 512 are attached to the vertical pipe of the support frame 1. Additionally, the connecting bracket 102 is coupled to the top ends of the two connecting bars 512. The connecting bars 512 are vertically adjustable to allow the position of the mounting rack 100 to be adjusted to accommodate the vertical height of any pool 2. As such, mounting bracket 100 can support the wave-making mechanism 3 on any pool or spa.

Figure 9:
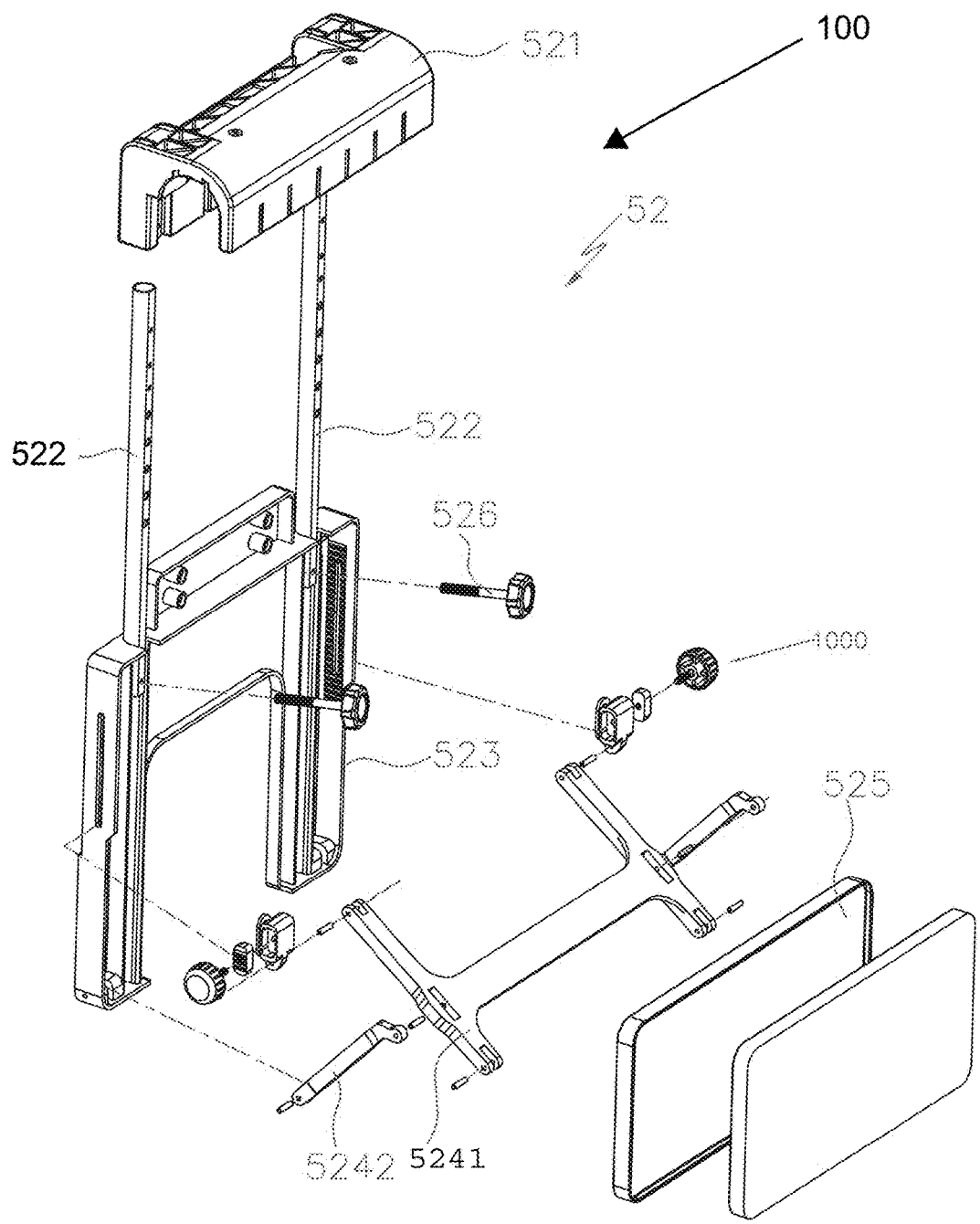
FIG. 9 is an exploded view of a suspension assembly for the mounting rack of FIG. 7.
Figure 10:
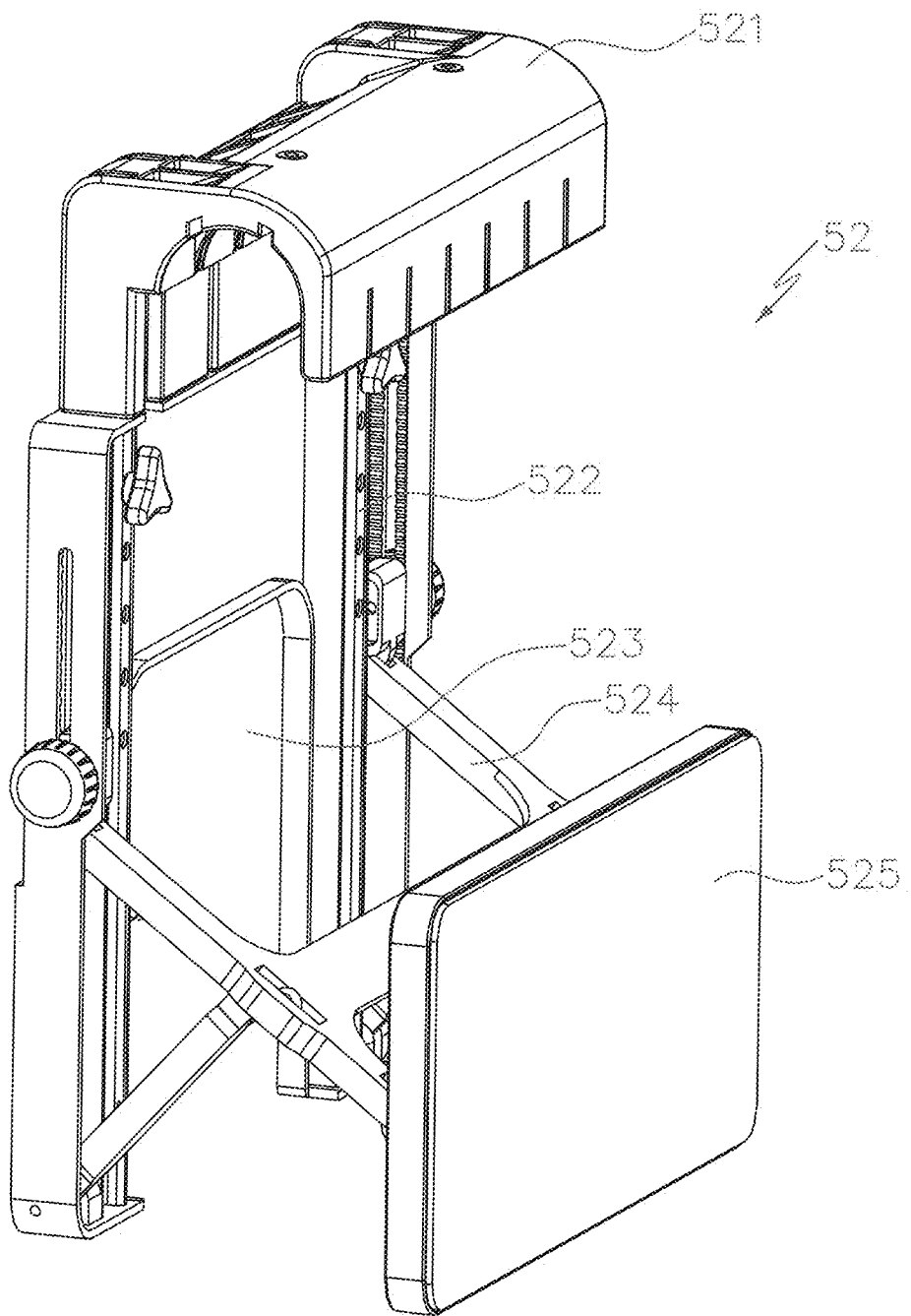
FIG. 10 is a perspective view of the suspension assembly of FIG. 9.

As shown in FIGS. 9 and 10, the suspension bracket 52 comprises a suspension member 521, illustratively having a hook configuration which is removably couple to the support bracket 511. The suspension bracket 52 further comprises two adjusting bars 522 connected to the suspension member 521 and a suspension panel 523 movably coupled to the two adjusting bars 522. Each suspension panel 523 is disposed with an adjusting support 524 to pivotably couple to a support plate 525. The adjusting support 524 includes first and second legs 5241, 5242 which pivot relative to each other. The first leg 5241 is connected to the suspension panel 523 and the support plate 525. The second leg 5242 is coupled to the lower end of the suspension panel 523 and the first leg 5241 which allows the adjusting support 524 to move the support plate 525 towards and away from the suspension panel 523 in a closed configuration and an open configuration, respectively. More particularly, a forward end of the second leg 5242 is slidably positioned within a slot of the first leg 5241 and is pivotably coupled to the suspension panel 523 such that the first and second legs 5241, 5242 move forwardly and rearwardly between the open and closed configurations. A locking knob 1000 is provided on the adjusting support 524 and the suspension panel 523 for moving the support plate 525 between the open and closed configurations.

Figure 11:
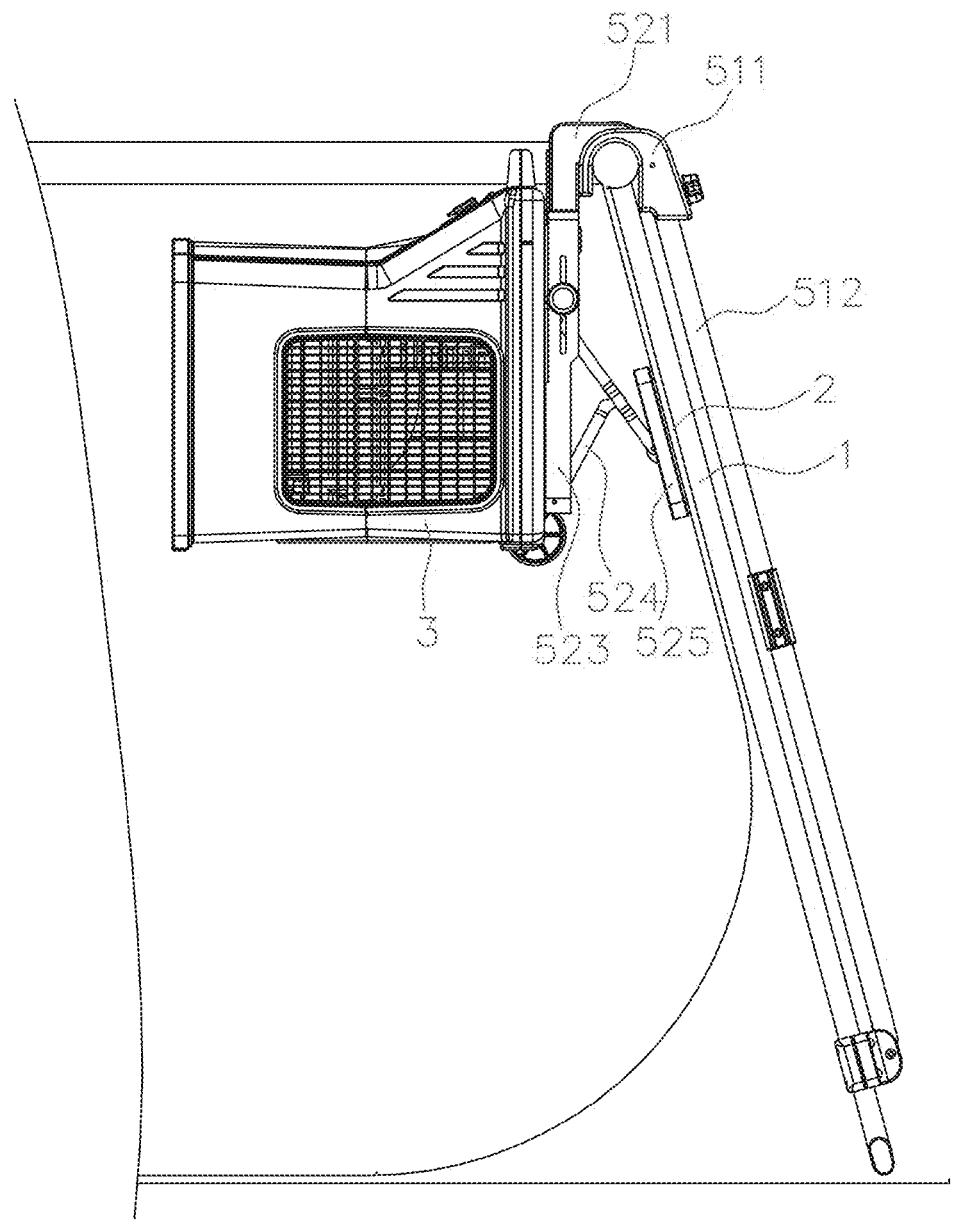
FIG. 11 is a side view of the mounting rack of FIG. 7 and the suspension assembly of FIG. 10 operably coupled to a side wall of the pool of FIG. 1 and supporting the wave-making mechanism of FIG. 2.
Figure 12:
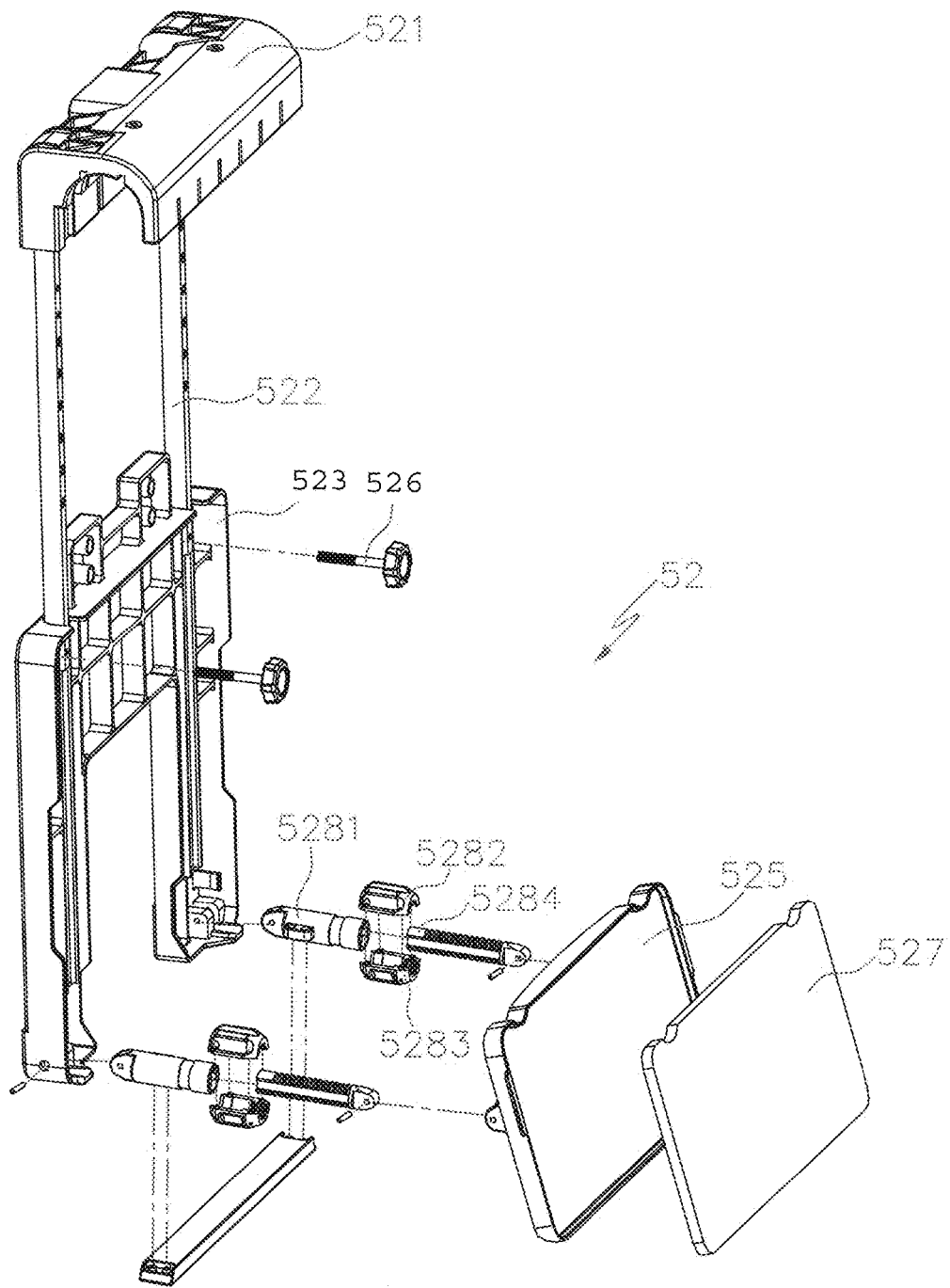
FIG. 12 is an exploded view of an alternative embodiment suspension assembly.

The support plate 525 is supported in or on the pool wall for supporting the wave-making mechanism 3 and the distance between the suspension bracket 52 and the pool wall is adjustable. More particularly, the support plate 525 is pivotable through the adjusting support 524 for accommodating the contour of any pool wall. As shown in FIG. 11, the rearward surface of the support plate 525 abuts the pool wall and may be angled relative to the suspension panels 523 to accommodate the contour of the pool wall. In this way, the suspension panels 523 maintain the wave-making mechanism 3 in a generally vertical orientation such that the bottom wall 12 of the wave-making mechanism 3 is generally parallel to the bottom surface of the pool 2. Additionally, the suspension panels 523 may be raised and lowered on adjusting bars 522 to adjust the vertical height of the wave-making mechanism 3 within the pool 2.

Figure 13:
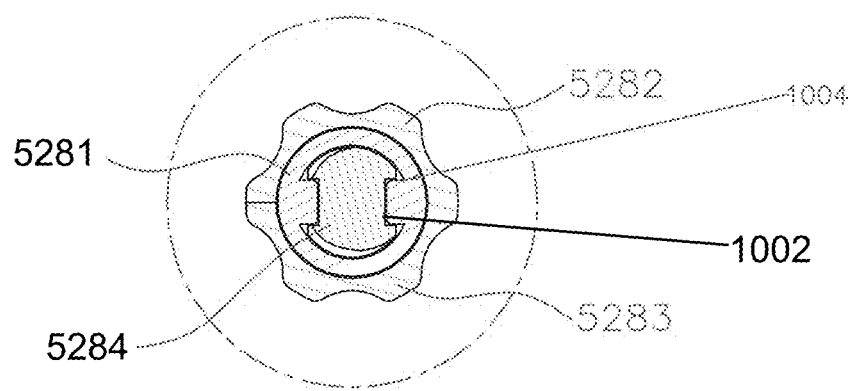
FIG. 13 is a cross-sectional view of a slidable leg assembly of the alternative embodiment suspension assembly of FIG. 12.
Figure 14:
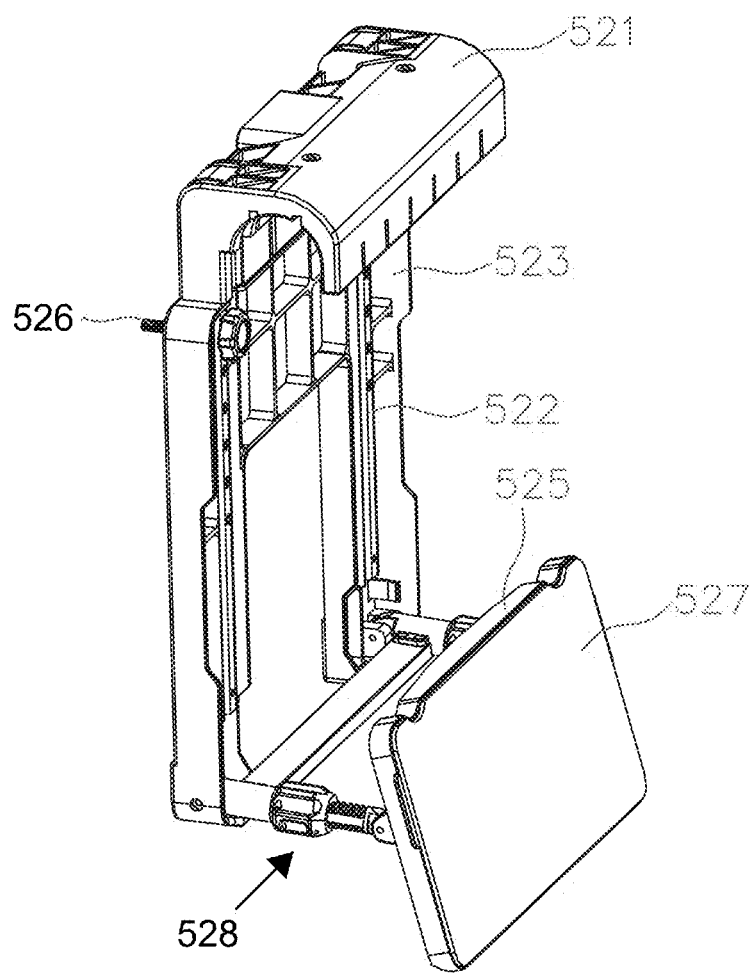
FIG. 14 is a perspective view of the suspension assembly of FIG. 12 in an open configuration.
Figure 15:
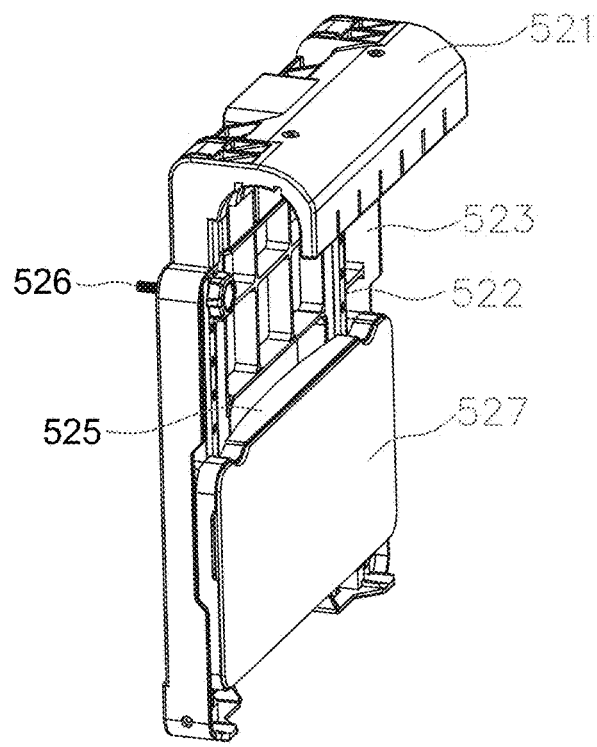
FIG. 15 is a perspective view of the suspension assembly of FIG. 12 in a closed configuration.
Figure 16:
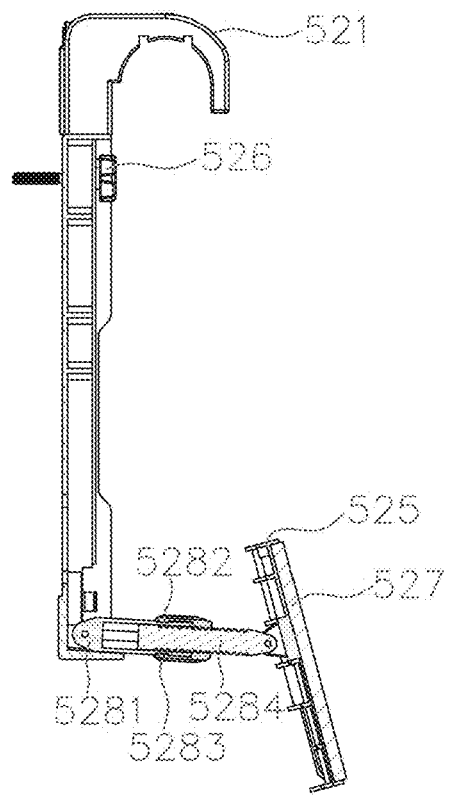
FIG. 16 is a cross-sectional view of the suspension assembly of FIG. 12 in an open configuration.

As shown in FIGS. 12-19, one embodiment of suspension bracket 52 comprises an alternative embodiment of the adjusting support 524 which is shown as an adjusting support 528. The adjusting support 528 allows for movement of the support plate 525. The adjusting support 528 includes first and second legs 5281, 5284 which are slidably coupled together. More particularly, the first leg 5281 defines a sleeve configured to receive the second leg 5284. The first leg 5281 is pivotably coupled to the suspension panel 523 and the second leg 5284 is pivotably coupled to the front side of the support plate 525. As shown in FIG. 13, the first leg 5281 is disposed with a lock groove 1002 and the second leg 5284 is disposed with a guiding groove 1004 which are complementary to each other for slidably receiving the second leg 5284 within the first leg 5281. With the configuration of the grooves 1002, 1004, the first and second legs 5281, 5284 do not rotate relative to each other. Screw nuts 5282, 5283 are rotatably coupled to the first leg 5281 and the second leg 5284 such that rotating the screw nuts 5282, 5283 allows the first and second legs 5281, 5284 to slide relative to each other and, therefore, the position of the support plate 525 may be adjusted between the open configuration and the closed configuration relative to suspension panel 523 and the pool wall.

Figure 17:
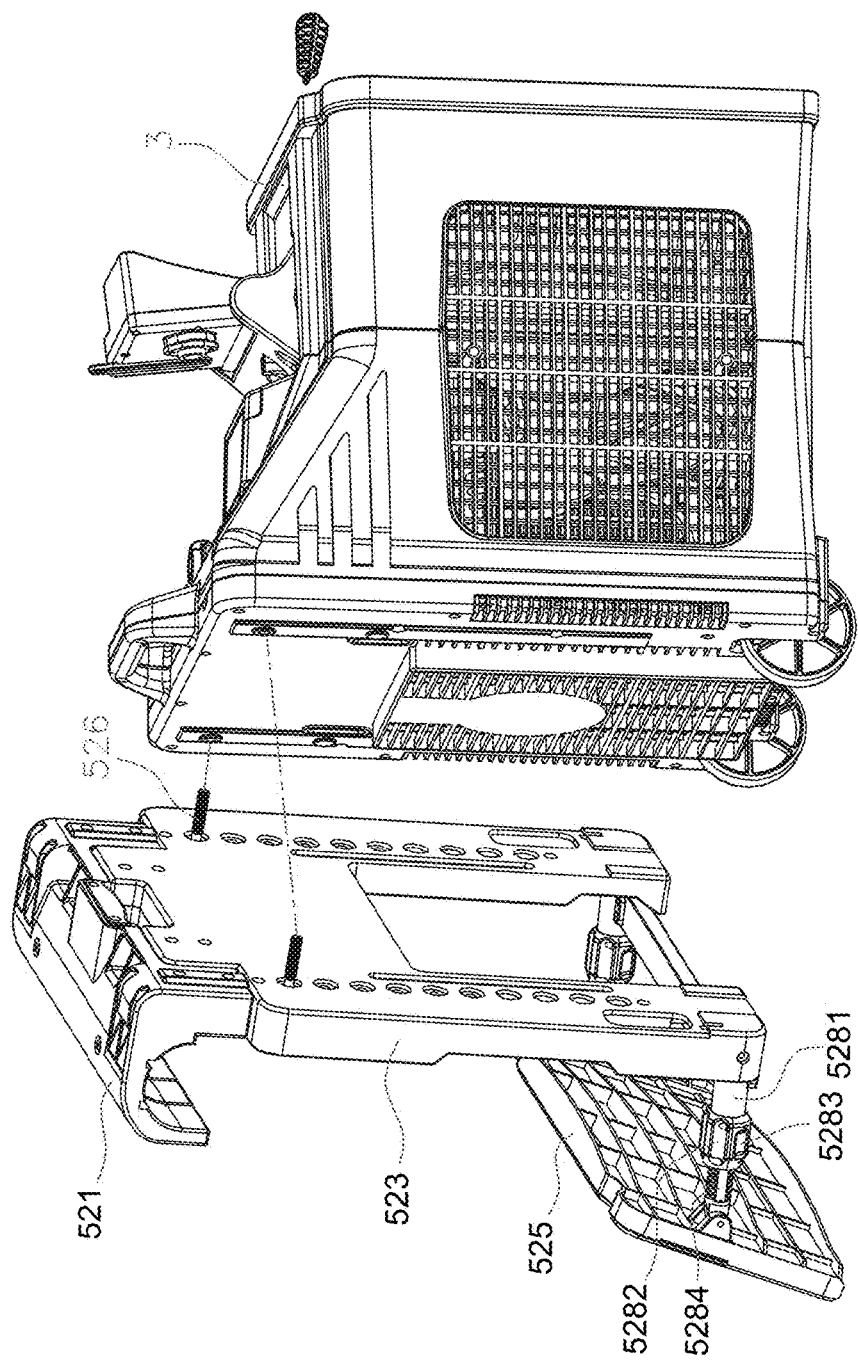
FIG. 17 is an exploded view of the suspension assembly of FIG. 14 and the wave-making mechanism of FIG. 2.
Figure 18:
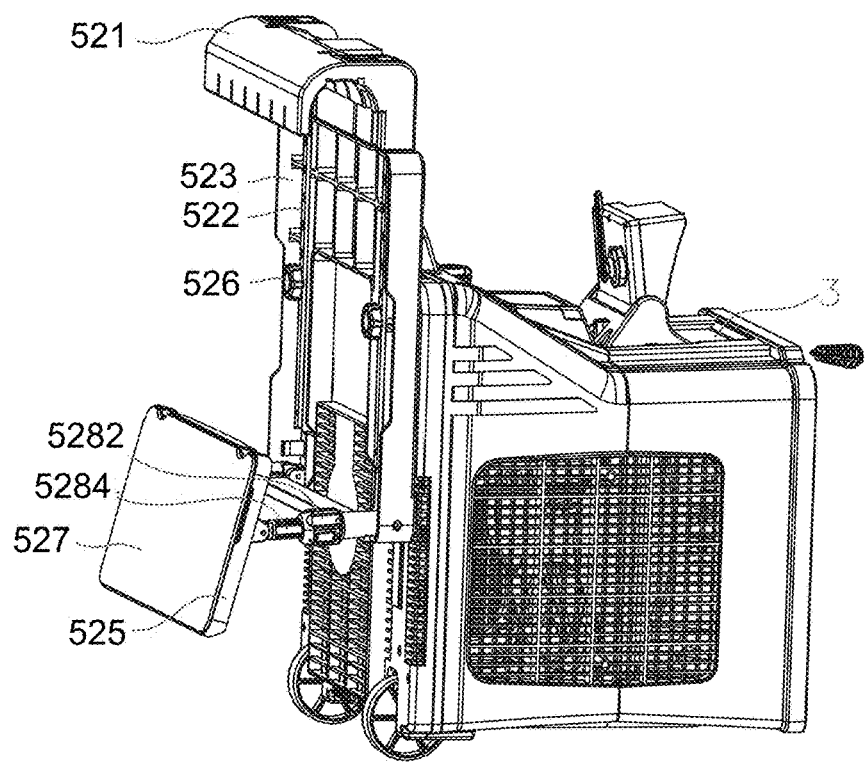
FIG. 18 is a perspective view of the suspension assembly of FIG. 14 in an open configuration and coupled to the wave-making mechanism of FIG. 2 in an elevated configuration.
Figure 19:
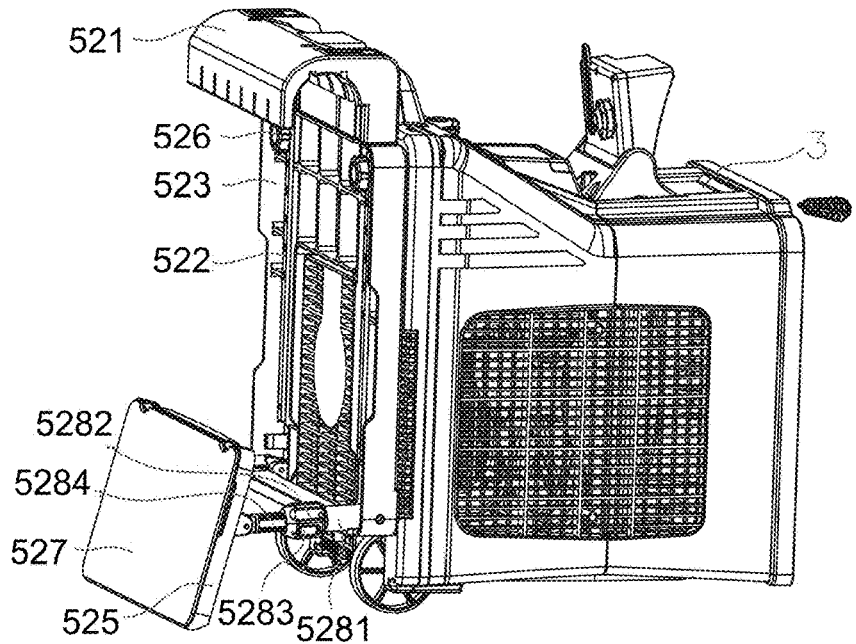
FIG. 19 is a perspective view of the suspension assembly of FIG. 14 in an open configuration and coupled to the wave-making mechanism of FIG. 2 in a lowered configuration.

The suspension bracket 52 of the mounting rack 100 is also configured to move between an elevated position and a lowered position because a row of assembly holes are disposed on the adjusting bars 522. Screws 526 are configured to pass through the assembly holes to secure the vertical position of the mounting rack 100 and the wave-making mechanism 3. More particularly, the screws 526 are received through the assembly holes in the adjusting bars 522 and corresponding apertures (not shown) on the suspension panels 523 and into corresponding holes in wave-making mechanism 3, as shown in FIG. 17. As such, the position of the suspension panels 523 and, therefore, wave-making mechanism 3, can be adjusted relative to the suspension member 521 by sliding the suspension panels 523 along the length of the adjusting bars 522. Therefore, the position of the wave-making mechanism 3 is adjustable within the pool 2. In this way, the vertical height of mounting rack 100 may be adjusted to support wave-making mechanism 3 on any pool 2, regardless of the height of the side walls of the pool.

Additionally, the suspension panels 523 and adjusting bars 522 are parallel to wave-making mechanism 3 such that the bottom side 12 of the wave-making mechanism 3 remains parallel to the bottom surface of the pool 2. Because the side walls of the pool 2 may not be perpendicular to the bottom surface of the pool, support plate 525 is configured to pivot to position a rear surface 527 of the support plate 525 against any configuration of the side wall of the pool 2, thereby allowing suspension panels 523 and adjusting bars 522 to remain perpendicular to the bottom surface of the pool 2 and the first and second legs 5281, 5284 of the adjusting support 528 for the proper orientation of the wave-making mechanism 3 within the water (e.g., the bottom surface 12 of the wave-making mechanism 3 being positioned parallel to the bottom surface of the pool 2).

Figure 20:
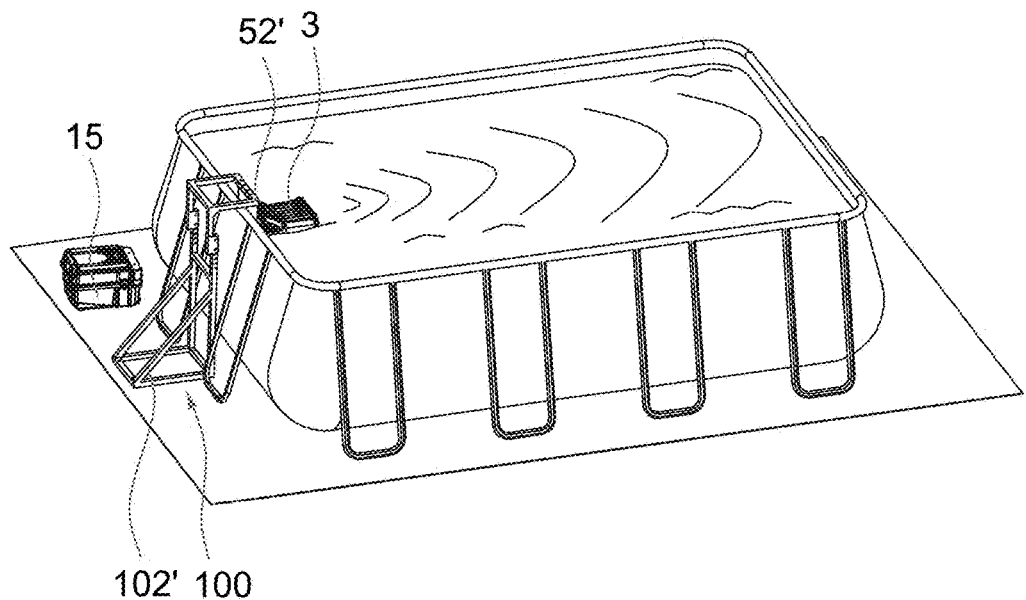
FIG. 20 is a perspective view of the illustrative pool and wave-making mechanism of FIG. 1 and an external power supply positioned in relation to the pool with the wave-making mechanism coupled to the pool with an alternative embodiment mounting rack.

As shown in FIG. 20, an alternative embodiment mounting rack 100' includes a connecting bracket 102' and suspension bracket 52'. Connecting bracket 102' is configured to be positioned on the ground adjacent the side wall of the pool 2 and extends over the top of the side wall of the pool 2 to couple with suspension bracket 52' and support the wave-making mechanism 3. Illustratively, the connecting bracket 102' forms a stand with a vertical length greater than that of the side wall of the pool 2. Additionally, the connecting bracket 102' may extend rearwardly from the pool 2 and form a stand on the ground surface. In one embodiment, the lower portion of connecting bracket 102' is positioned in proximity to the external power supply 15.

Referring to FIGS. 21-25, a control circuit of wave-making mechanism 3 comprises a starting circuit 1100, an MCU single chip 1102, a drive circuit 1103, and the motor 5. The control circuit further comprises an abnormal condition protection circuit to control the power or on-off of a power circuit of the motor 5 and an over-current protection circuit to control the power or on-off of a work circuit of the motor 5. The drive circuit 1103 is applied with an N-channel enhancement MOS field effect transistor Q2.

The abnormal condition protection circuit comprises an abnormal condition signal input circuit 1104, a third lock and shield circuit 1105, a first drive triode (NPN transistor) 1106, and a first relay RY3.

An output of the abnormal condition signal input circuit 1104 is connected to an input of the third lock and shield circuit 1105. A drive output of the single chip 1102 and an output of the third lock and shield circuit 1105 are connected to the base of the first triode 1106. An emitter of the first triode 1106 is grounded and a collector of the first triode 1106 is connected to one port of a coil of the first relay RY3. The other port of the coil of the first relay RY3 is connected to the first port of the motor 5. The normal open contact of the first relay RY3 is connected between the external power supply 15 and the first port of the motor 5.

The over-current protection circuit comprises a pulse width modulation ("PWM") convert reference voltage circuit 61, a comparator 62, a first lock and shield circuit 63, a second lock and shield circuit 64, a second drive triode (NPN transistor) 65, a signal amplifying circuit 66, and a second relay drive circuit. The PWM convert reference voltage circuit 61 comprises a triode Q6, a resistor R16, a resistor R18, an adjustable resistor R103 and an electrolytic capacitor C10. The base of the triode Q6 is connected to the PWM drive signal output of the single chip 1102. The collector of the triode Q6 is connected to a port of the resistor R16 and a port of the resistor R18. The other port of the resistor R16 is connected to the external power supply 15. The other port of the resistor R18 serves as the output of the PWM convert reference voltage circuit 61 and is connected to one port of the adjustable resistor R103 and the positive pole of the electrolytic capacitor C10. The other port of the adjustable resistor R103, the emitter of the triode Q6, and the negative pole of the electrolytic capacitor C10 are grounded. By adjusting the adjustable resistor R103 can set the reference resistance according to the resolution ratio of the reference voltage of the PWM duty ratio can be adjusted at different scopes so as to achieve actual control accuracy of the operation of the wave-making mechanism 3.

If the single chip 1102 outputs a high level PWM drive signal, the triode Q6 is in a break-over condition (a positive anode voltage changes to a conductive state with a gate circuit open) and the electrolytic capacitor C10 charges through the resistor R18, the triode Q6, and the adjustable resistor R103. The voltage of the output of the PWM convert reference voltage circuit 61 may be gradually reduced in this break-over condition. If the single chip 1102 outputs low level PWM drive signal, the triode Q6 is in a decrease or cut-off condition and the output of the PWM convert reference voltage circuit 61 is the divided voltage of the adjustable resistor R103. The electrolytic capacitor C10 discharges through the resistor R16 and the resistor R18, and the output of the PWM convert reference voltage circuit 61 gradually increases.

Figure 25:
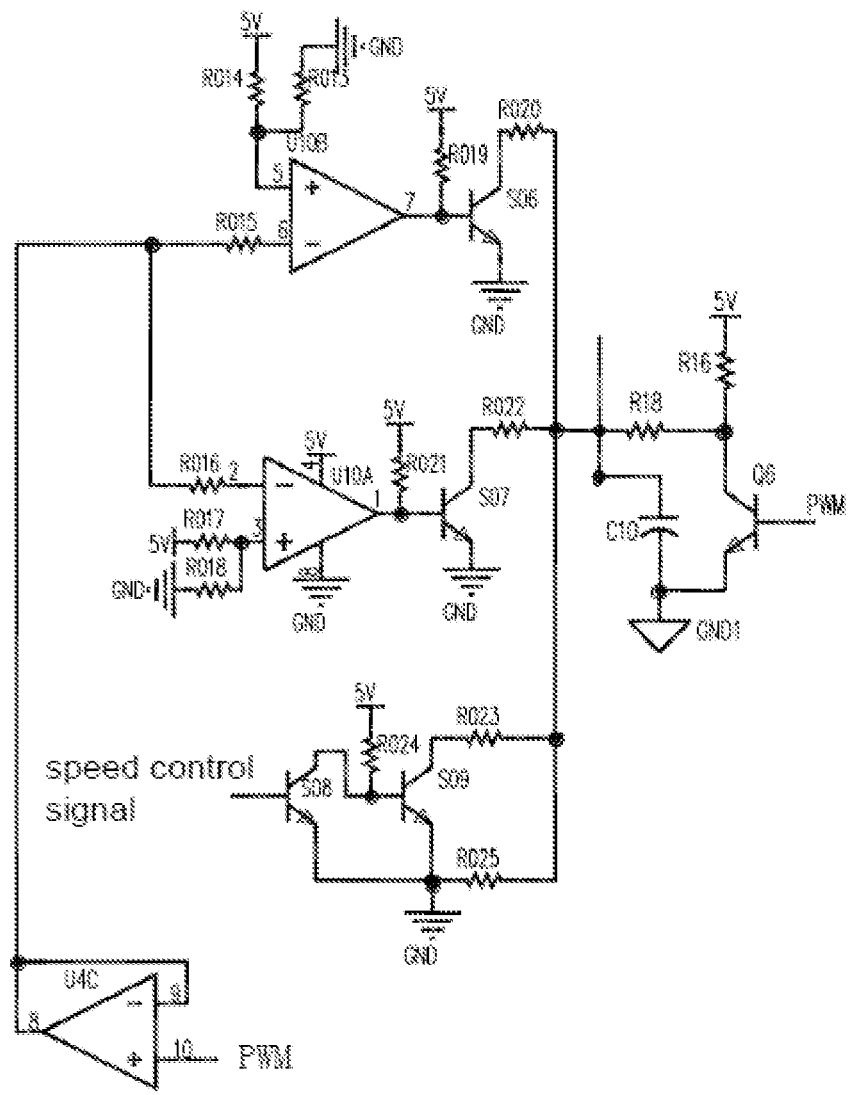
FIG. 25 is a further illustrative control circuit diagram for the PWM circuit of FIG. 24.
Figure 26:
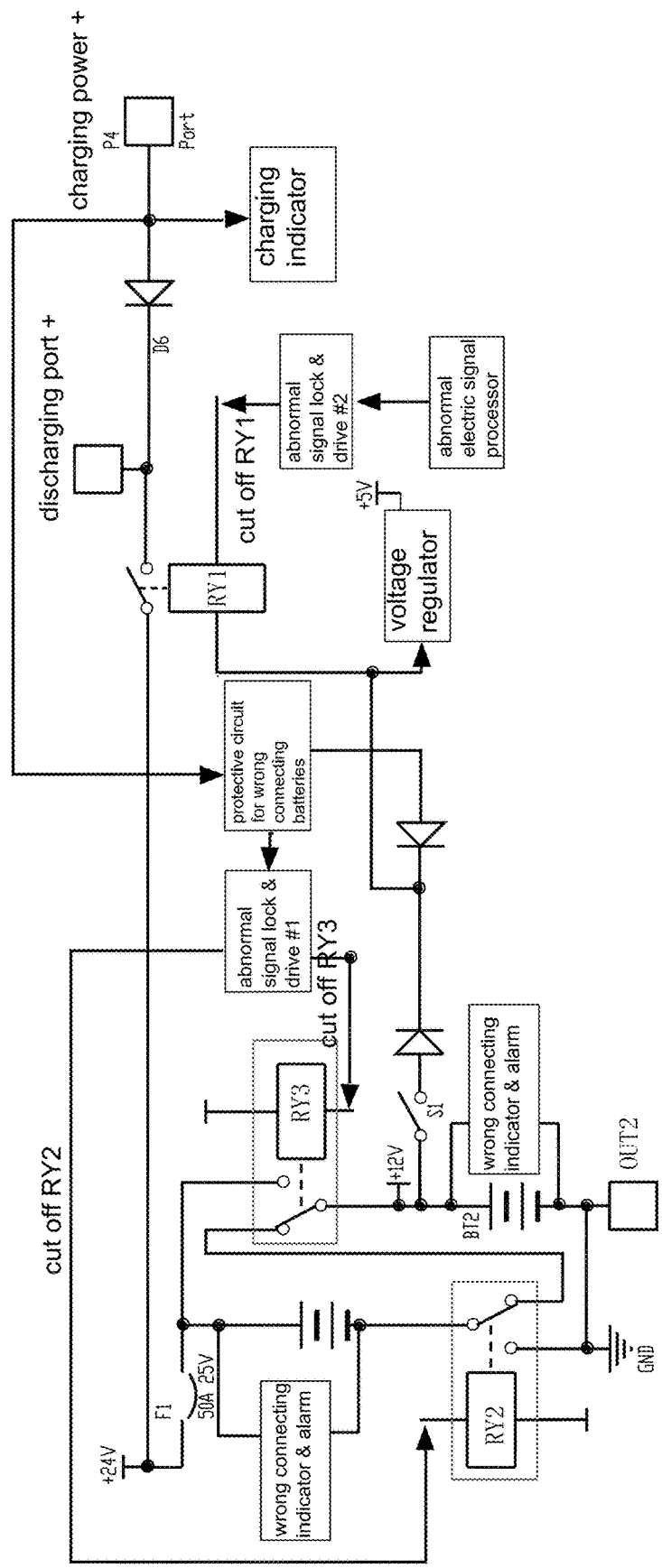
FIG. 26 is an illustrative control circuit diagram for an anti-reverse battery circuit of the present disclosure.

As shown in FIG. 25, the adjustable resistor R103 can be replaced by an automatic adjustable resistor. The automatic adjustable resistor comprises a comparator U4C, a shift base circuit, a first shift selection circuit, a second shift selection circuit, and a third shift selection circuit. The in-phase input of the comparator U4C is connected to the PWM drive signal output of the single chip 1102 and the invert-phase input of the comparator U4C is connected to the output of the comparator U4C.

The shift base circuit is disposed with a reference circuit R025. One port is directly grounded and the other port is connected to the resistor R18. The first shift selection circuit is disposed with a comparator U10B. The invert-phase input of the comparator U10B is connected to the output of the comparator U4C through a resistor R015. The in-phase input of the comparator U10B is connected to one port of the resistors R013 and R014. The other port of the resistor R014 is connected to 5 V power and the other port of the R013 is grounded. The output of the comparator U10B is connected to the base of a triode S06 and a collector of the triode S06 is connected the resistor R020. The other port of the resistor R020 is connected to the resistor R18. The second shift selection circuit is disposed with a comparator U10A. The invert-phase input of the comparator U10A is connected to the output of the comparator U4C through the resistor R016 and to one port of the resistors R017 and R108. The other port of the resistor R017 is connected to 5 V power and the other port of the resistor R018 is grounded. The output of the comparator U10A is connected to the base of the triode S07. The collector of the triode S07 is connected the resistor R022 and the other port of the resistor R022 is connected to the resistor R18.

The third shift selection circuit is disposed with a triode S08, a resistor R024, a triode S09, a resistor R023 and a resistor R025, the base of the triode S08 is connected to shift mechanical control signal. The emitter is grounded and the collector is connected to one port of the resistor R024 and the base of the triode S09. The other port of the resistor R024 is connected to 5 V power. The collector of the triode S09 is connected to the resistor R18 through the resistor R023 and the emitter is grounded.

If any of the resistor R022 and/or the resistor R021 have a branch in a break-over condition and form a parallel connection circuit with the resistor R025, the resistance function may be changed automatically.

By choosing the different resistance value of resistors R013, R014 and R017, R018, the reference voltage of the comparator U10A and the comparator U10B are different.

If the shift mechanical control signal input is at a high level, the triode S08 is in break-over condition and the triode S09 is in the cut-off condition. As such, the resistance value of the resistor R025 is the resistance value of the automatically adjustable resistor.

If the shift mechanical control signal input is at a low level, the triode S09 also is in the break-over condition and enters an automatically control mode, in which the in-phase input of the comparator U4C receives one shift PWM drive signal. In this condition, the comparator U10A or the comparator U10B outputs at a high level and the triode S06 or S07 is in the break-over condition. The resistance value of the resistor R025, resistor R023 and resistor R020 and/or the resistor R025, resistor R023, and resistor R022, after being connected in parallel is the resistance value of the automatically adjustable resistor. As such, the first, second, and/or third shift selection circuit can automatically adjust the resistance value.

Figure 21:
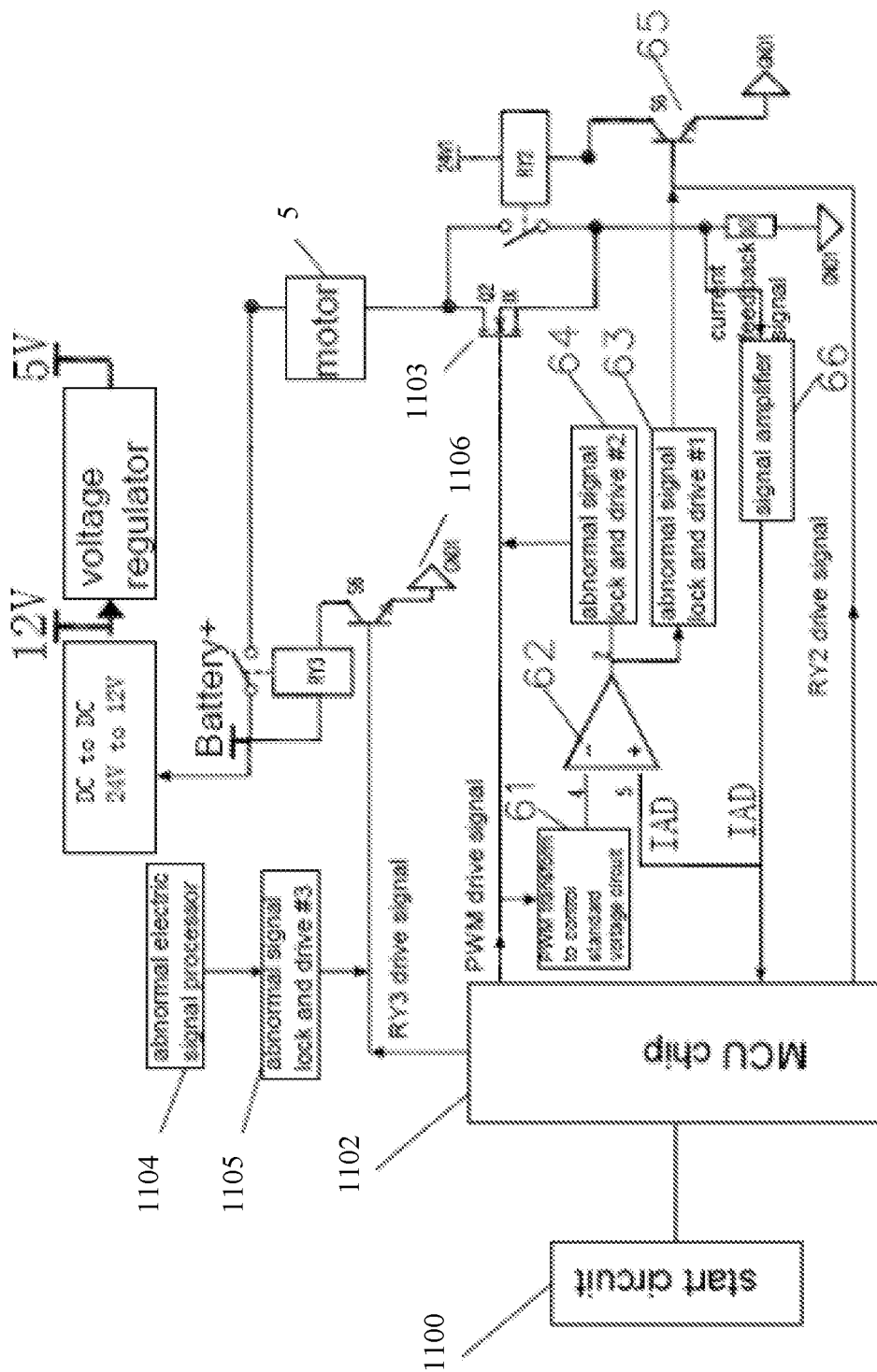
FIG. 21 is an illustrative control circuit diagram for a control assembly of the wave-making mechanism of FIG. 2.
Figure 22:
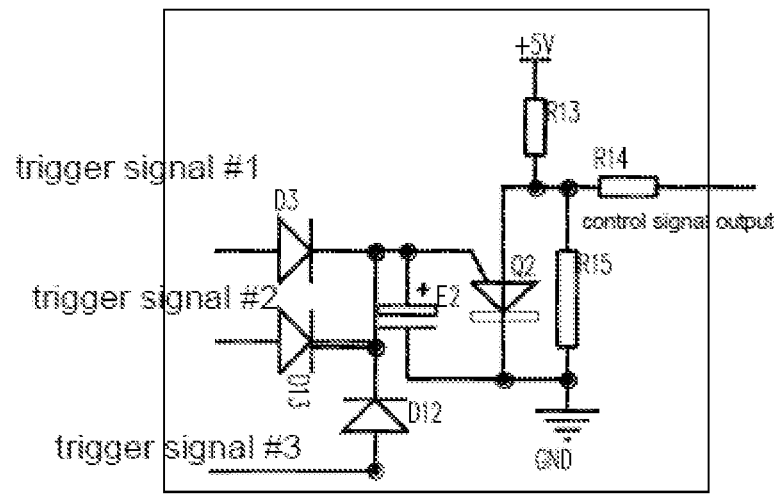
FIG. 22 is an illustrative control circuit diagram of a first, second, and third locking circuits of FIG. 21.
Figure 23:
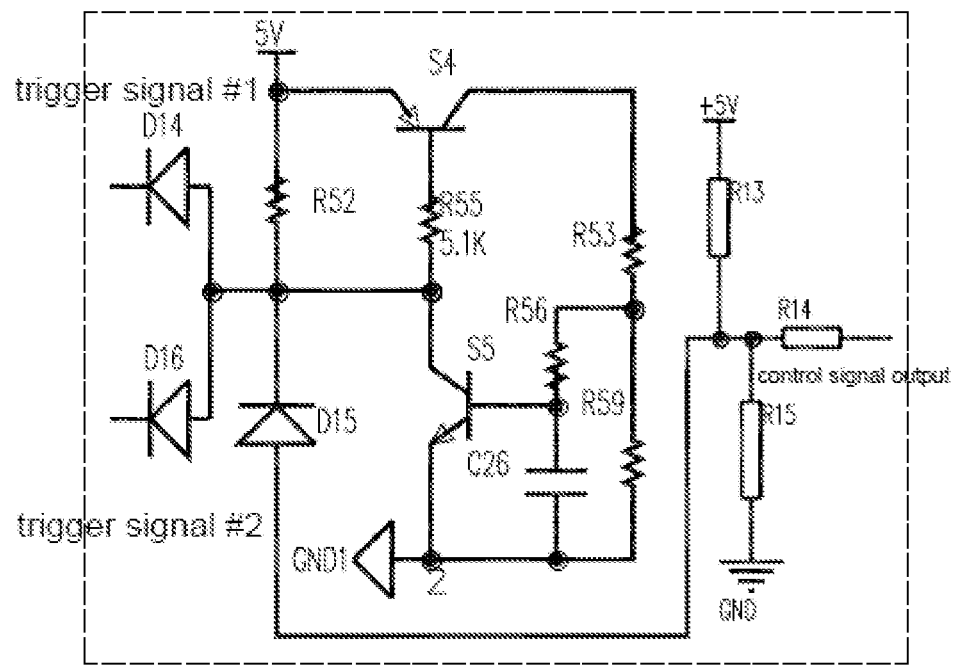
FIG. 23 is an illustrative circuit diagram for the third locking circuit of FIG. 22.
Figure 24:
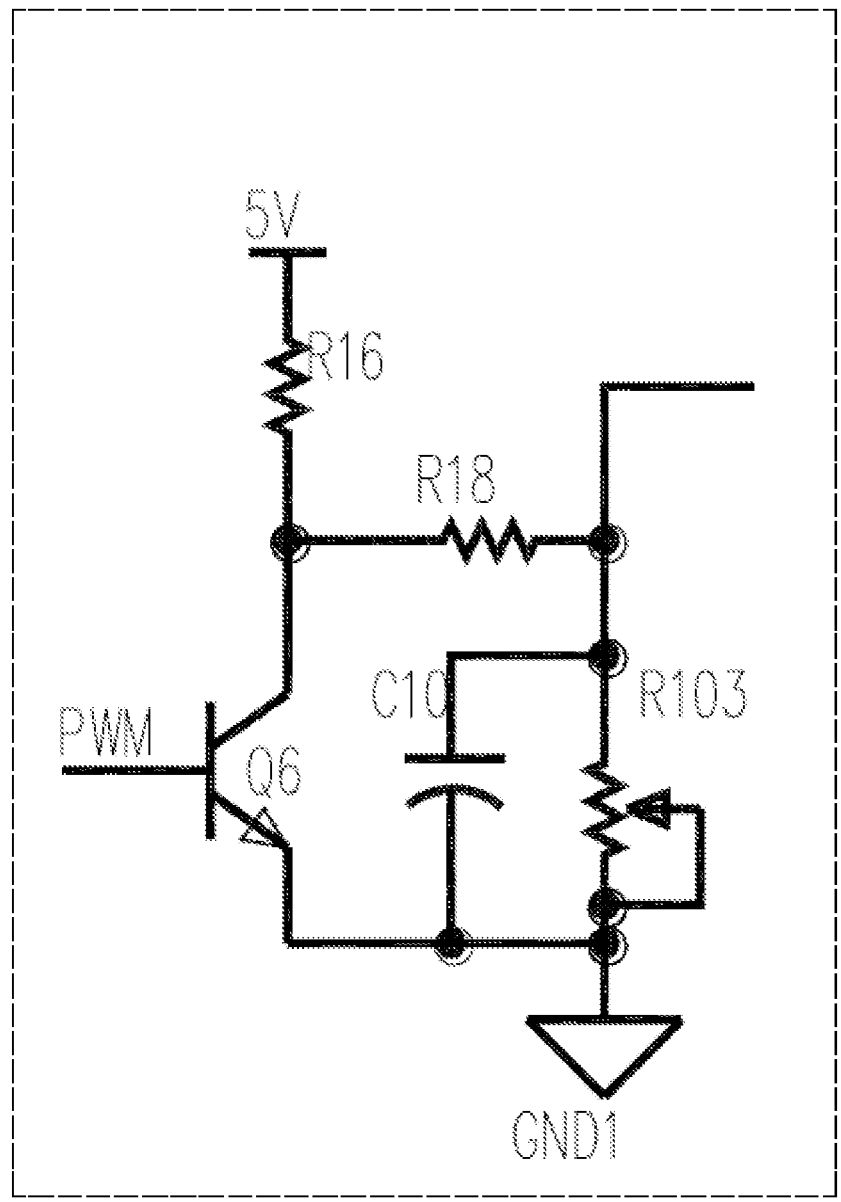
FIG. 24 is an illustrative control circuit diagram for a pulse width modulation ("PWM") circuit of FIG. 21.

As shown in FIG. 21, the circuit principle of the first lock and shield circuit 63, the second lock and shield circuit 64, and the circuit principle of the third lock and shield circuit 1105 is shown. Referring to FIG. 22, if the trigger signal is at a high level, the silicon controlled rectifier Q2 is in the break-over condition and the control signal output decreases to a low level. As shown in FIG. 23, if the trigger signal is low level, the triode S4 and the triode S5 are in the break-over condition and the control signal output decreases to a low level.

The second relay drive circuit comprises the second drive triode S6 (65) and a relay RY2. The PWM signal output of the single chip 1102 is connected to the input of the PWM convert reference voltage circuit 61 and a grid electrode of a filed effect transistor Q2. The output of the PWM convert reference voltage circuit 61 is connected to the invert-phase input of a comparator 62. The input of a signal amplifying circuit 66 is connected to the current feedback contact of the work circuit of the motor 5. The output of the signal amplifying circuit 66 is connected to the in-phase input of the comparator 62 and the output of the comparator 62 is connected to an input of the first lock and shield circuit 63 and the second lock and shield circuit 64. The output of the first lock and shield circuit 63 and the drive output of the single chip 1102 are connected to the base of the second drive triode 65. An emitter of the second drive triode 65 is grounded and a collector is connected to one port of a coil of the second relay RY2. The other end of the coil of the second relay RY2 is connected to the external power supply 15. The normal open contact of the second relay RY2 is connected between a drain electrode and a source electrode of the field effect transistor Q2. The drain electrode of the field effect transistor Q2 is connected to the second port of the motor 5 and the source electrode is grounded though a resistor RS. The output of the second lock and shield circuit 64 is connected to the grid electrode of the field effect transistor Q2. When in a normal work condition and starting circuit 1100 is actuated, the starting circuit 1100 outputs a start signal to the single chip 1102. The single chip 1102 then outputs a corresponding drive signal to the base of the first drive triode 53. The first drive triode 53 then is in the break-over condition, the first relay RY3 is powered, and the normal-open contact is closed. At the same time the single chip 1102 outputs a corresponding shift PWM signal to the field effect transistor Q2, and the field effect transistor Q2 is then in the break-over condition and outputs a corresponding drive signal to the motor 5 to control the motor 5 to work in the set mode.

To change the shift, the starting circuit 1100 outputs a corresponding shift signal to the single chip 1102 and the single chip 1102 outputs a corresponding PWM signal to the field effect transistor Q2 to control the motor 5 to work in the corresponding shift. If the shift reaches to the largest value, the single chip 1102 outputs a drive signal to the second drive triode 65, the second relay is closed, and the motor 5 works in the largest shift.

The abnormal condition signal input circuit 1104 collects various signals of the wave-making mechanism 3 (such as motor temperature, MOS transistor temperature, shut-off conditions, etc.). If an abnormal condition happens, the abnormal condition signal input circuit 1104 outputs an abnormal condition signal (high level or low level) to the third lock and shield circuit 1105 and the third lock and shield circuit 1105 outputs a low level to signal a stop or cut off of the power to the first triode 1106. The first relay RY3 then loses power which cuts off the power circuit of the motor 5 and stops the motor 5 from rotating.

The PWM convert reference voltage circuit 61 converts the PWM signal of the single chip 1102 to reference voltage which is sent to the invert-phase input of the comparator 62. The feedback current that the work circuit of the motor 5 collects is amplified by the signal amplifying circuit 66 and is then sent to the in-phase input of the comparator 62. If the current of the work circuit of the motor 5 exceeds a set value, the comparator 62 outputs a high level signal to the first lock and shield circuit 63 and the second lock and shield circuit 64, and the second lock and shield circuit 64 outputs a low level signal to cut off the field effect transistor Q2. At the same time, the first lock and shield circuit 63 outputs a low level signal to cut off the second drive triode 65, the second relay RY2 loses power and the work circuit of the motor 5 is cut off to stop rotation of the motor 5.

As disclosed herein, the control circuit of the wave-making mechanism 3 includes the PWM convert reference voltage circuit to convert different PWM drive signals of conducting time of different shifts of the single chip 1102 to reference input voltage of the comparator 62. Additionally, combining the first lock and shield circuit 63, the second lock and shield circuit 64, the drive circuit 1103, and the second relay drive circuit to control the on-off of the motor 5, multi-shift PWM drive signals may share one protection circuit.

As shown in FIGS. 26-31, an anti-reverse battery device is operably coupled to the wave-making mechanism 3 and comprises two rechargeable batteries BT1, BT2. An end of each of the rechargeable batteries BT1, BT2 is connected in parallel with a reverse indicator and a buzzer circuit, respectively. When the batteries BT1, BT2 are assembled, the reverse indictor and the buzzer circuit send out audible and/or visual signals to the user (e.g., light and voice signals to indicate an output to the user).

The rechargeable batteries BT1, BT2 are connected in series with the single-pole double-throw relays RY2, RY3, respectively, which serve as a charging-discharging change-over switch. By using the normal close and normal open contacts of the single-pole double-throw relays RY2, RY3, the batteries BT1, BT2 are respectively connected to battery charging circuit and battery discharging circuit. More particularly, if the single-pole double-throw relays RY2, RY3 are not provided with power, the normal open contact of the single-pole double-throw relays RY2, RY3 is open and the normal closed contact is closed when the batteries BT1, BT2 are connected in series to the battery charging circuit. If the single-pole double-throw relays RY2, RY3 are powered, the normal open contact of the single-pole double-throw relays RY2, RY3 is closed and the normal closed contact is open when the batteries BT1, BT2 are connected in parallel to the battery discharging circuit. A battery-reverse anti-discharging circuit and the first lock and shield circuit 63 are connected between the discharge power and the power drive port of the relays RY2, RY3.

Figure 27:
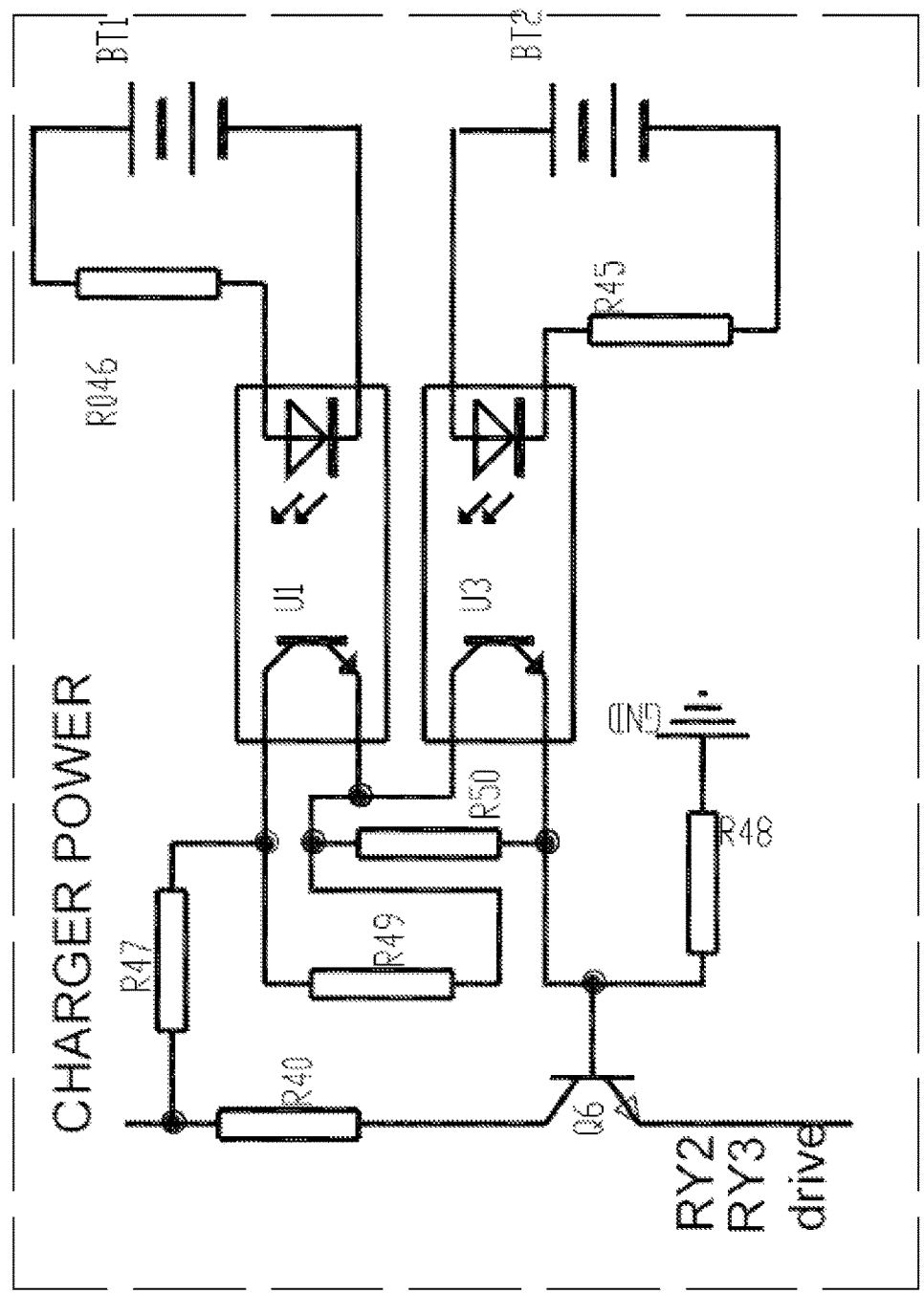
FIG. 27 is a further illustrative control circuit diagram for the anti-reverse battery circuit of FIG. 26.

Referring to FIG. 27, the battery-reverse anti-discharging circuit comprises two optically-coupled components U1, U3, a resistor R40, resistors R45-R50 and an NPN-type triode Q6 to control the discharge power. The control inputs of the optical coupled components U1, U3 are connected in parallel to the positive and negative electrodes of the batteries BT1, BT2, respectively. The outputs of the optically-coupled components U1, U3 are connected in parallel to the resistors R49, R50, respectively. An output emitter of the optically-coupled component U1 is connected to one end of the resistor R49, and is connected to the discharge power by the resistor R47. An output emitter of the optically-coupled component U3 is connected to one end of the resistor R50, the other end of the resistor R49 and the output collector of the optical coupled component U1. An output emitter of the optically-coupled component U3 is connected to the other end of the resistor R50, the base of the triode Q6 and one end of the resistor R48. The other end of the resistor R48 is grounded. The emitter of the triode Q6 is connected to the discharge power by the current-limiting resistor R40 and to the drive power port of the relays RY2, RY3. The resistors R49, R50 and the resistors R47, R48 are homogeneous pairs such that the resistance values of the resistors R49, R50 are greater than the resistance value of the resistors R47, R48.

Figure 28:
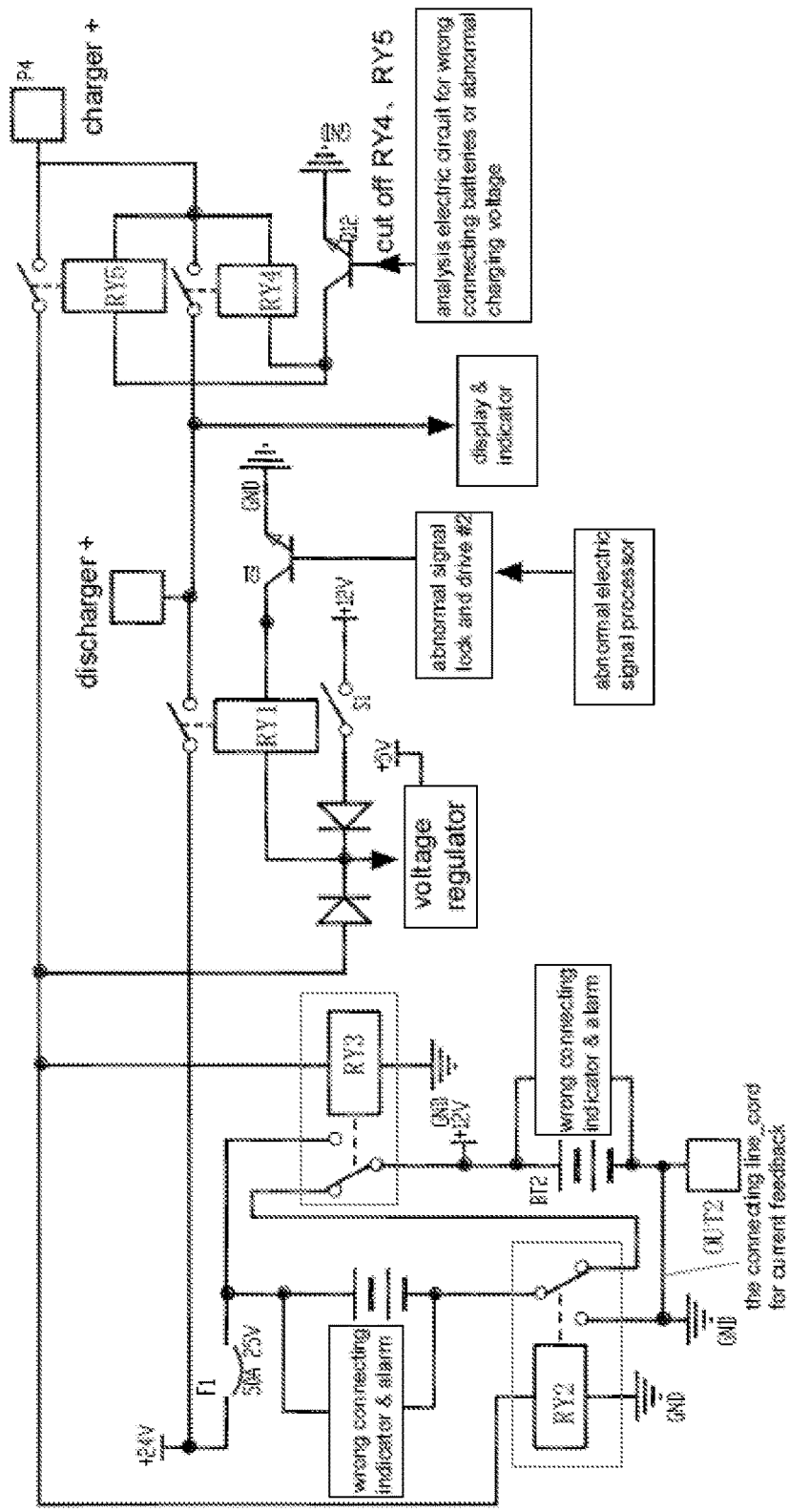
FIG. 28 is an alternative embodiment control circuit diagram for the anti-reverse battery circuit of the present disclosure.
Figure 30:
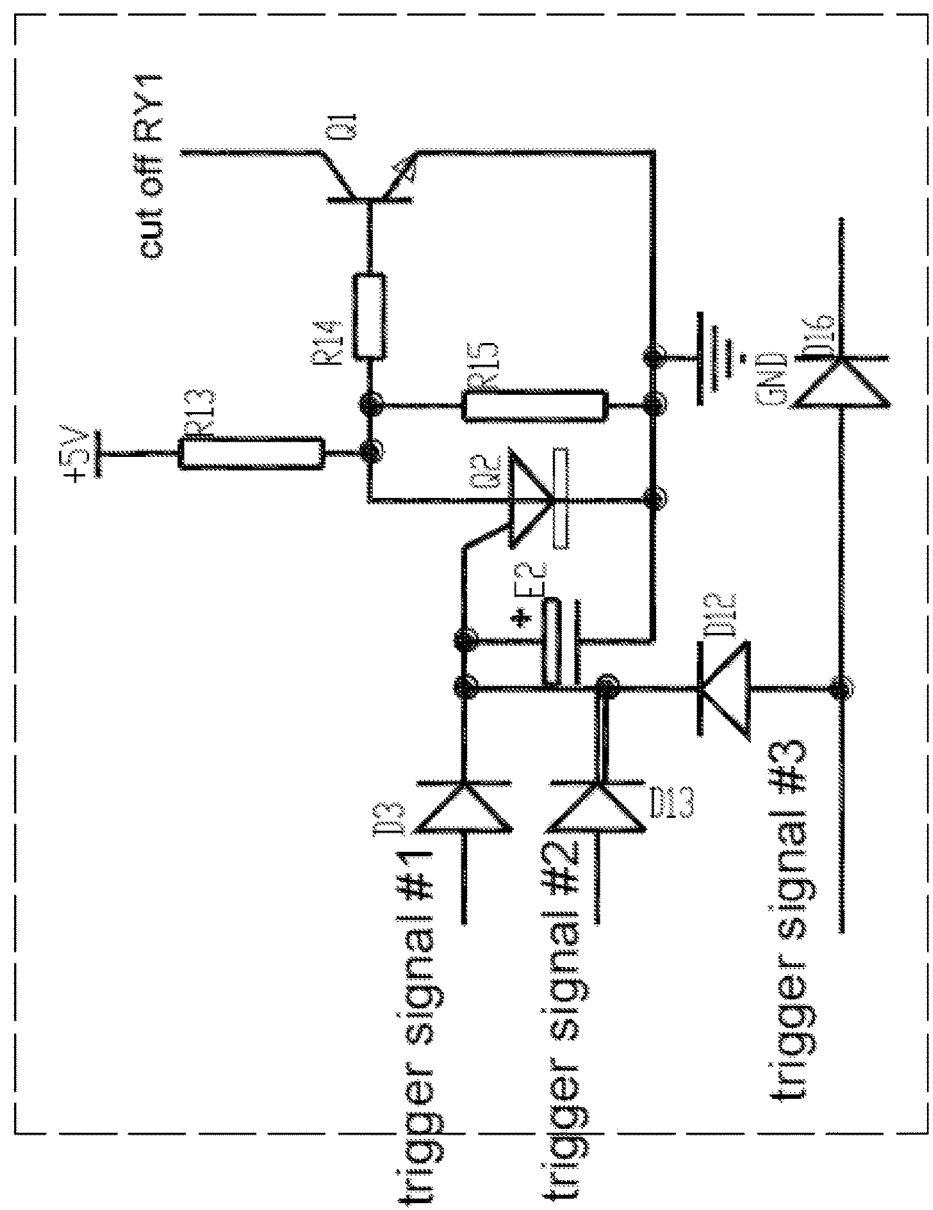
FIG. 30 is an illustrative control circuit diagram of the first and second locking circuits of FIG. 22.
Figure 31:
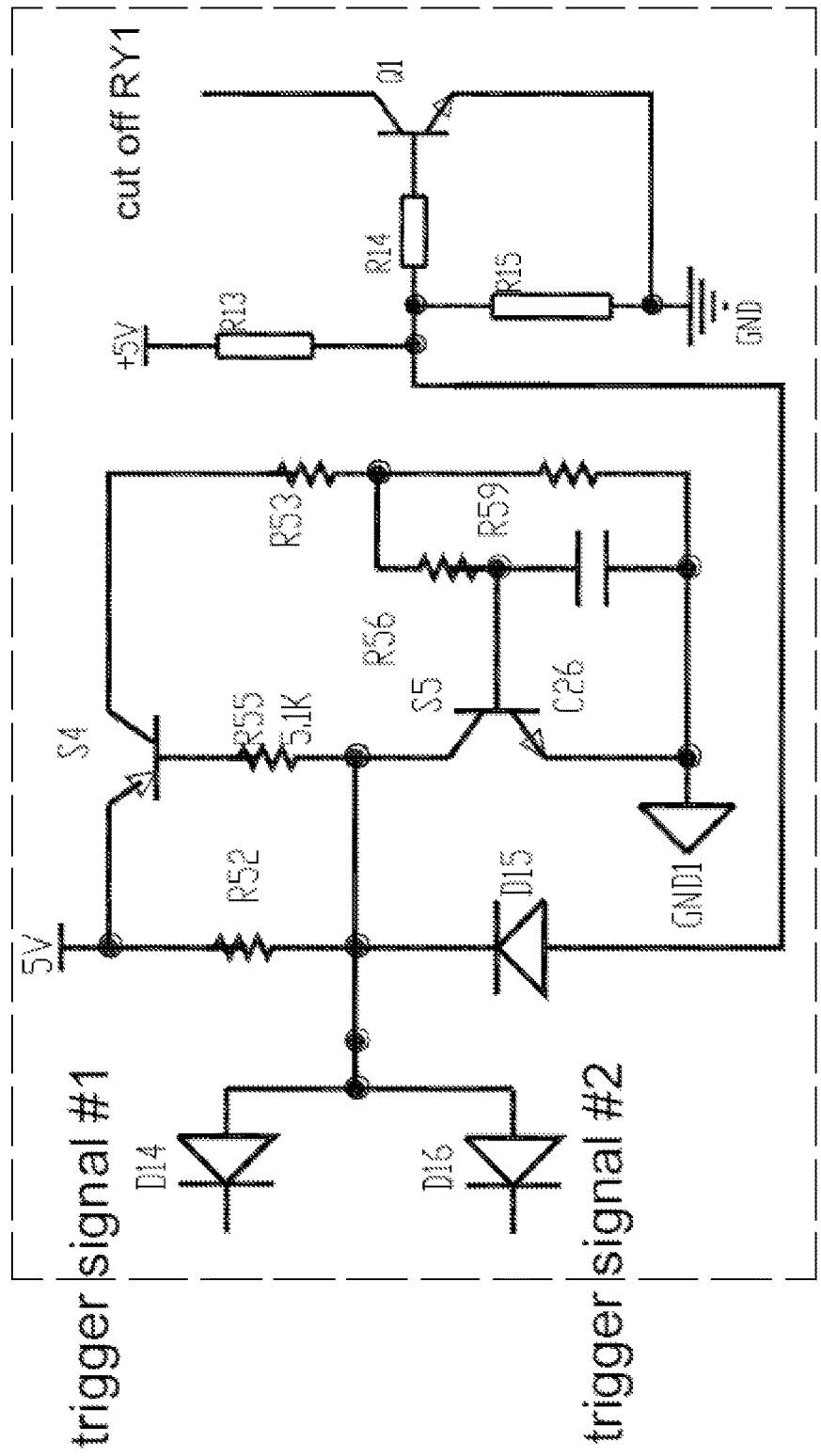
FIG. 31 is an illustrative control circuit diagram of the second locking circuit of FIG. 30.

The working principle of the first lock and shield circuit 63 is shown in FIG. 30 and the working principle of the second lock and shield circuit 1105 is shown in FIGS. 30-31. Referring to FIG. 30, if the trigger signal is at a high level, the silicon controlled transistor Q2 is in the break-over condition, the level of the base of the triode Q1 is decreased and/or cut off, and the collector of the triode Q1 has no output. Referring to FIG. 28, if the trigger signal is at a low level, the triode S4 and the triode S5 are in the break-over condition such that the level of the base of the triode Q1 is decreased and/or cut off and the collector of the triode Q1 has no output.

When the batteries BT1, BT2 are contacted, the optically-coupled components U1 and U3 are in the break-over condition, the triode Q6 is also in the break-over condition, the emitter of the triode Q6 outputs drive power to the relays RY2, RY3, the relays RY2, RY3 are thus are powered. Additionally, when the batteries BT1, BT2 are contacted, the normal open contact of the relays RY2, RY3 is closed, the normal closed contact is open, the batteries BT1, BT2 are connected in parallel to the battery discharging circuit, and the batteries BT1, BT2 are discharged.

If one or both of the batteries BT1, BT2 are reversely assembled or in bad contact in the recharger or charging station, the optically-coupled components U1 and/or U3 are cut off because the resistor R49 and R50 have large resistance value for shorting. As such, the triode Q6 is not connected and, therefore, does not output drive power to the relays RY2, RY3. In this way, the relays RY2, RY3 have no power and the normal open contacts of the relays RY2, RY3 are open, the normal closed contacts are closed, and two batteries BT1, BT2 are connected in series to the battery charging circuit, thereby preventing discharge from occurring in error. As such, the batteries BT1, BT2 are prevented from recharging if the batteries BT1, BT2 are positioned in the reverse orientation in a charging station in order to prevent damage to the batteries BT1, BT2 and/or the charging station.

As disclosed above, the control circuit further comprises an abnormal condition protection circuit, which comprises an abnormal signal input circuit 1104, a second lock and shield circuit, and a relay RY1. The output of the abnormal signal input circuit 1104 is connected to the input of the second lock and shield circuit and the output of the second lock and shield circuit is connected to one port of the coil of the relay RY1. The other port of the coil of the relay RY1 is connected to the power port. The relay RY1 has a normal open contact which connects to the discharging circuit to control the on-off of the discharging circuit. During operation of the wave-making mechanism 3, switch S1 is turned to the "on" position.

If normal signal input circuit has no output, the single direction silicon controlled transistor Q2 is cut off, the triode Q1 is in the break-over condition, and the relay RY1 is powered. In this condition, the normal open contact is closed and the discharging circuit is on such that the batteries BT1, BT2 can be normally discharged. The discharge indicating light of the discharge indicator circuit is turned on to signal the user that the batteries BT1, BT2 are being discharged.

As shown in FIG. 30, if abnormal signal input circuit 1104 outputs a high level abnormal trigger signal, the abnormal trigger signal triggers the single direction silicon controlled transistor Q2 that a break-over condition is occurring. In this condition, the voltage of the base of the triode Q1 is decreased and/or cut off, the relay RY1 is powered off, the normal open contact is open, the discharging circuit is cut off, and the batteries BT1, BT2 are not discharged. As shown in FIG. 31, if the abnormal signal input circuit outputs a low level abnormal trigger signal, the triode S4 and the triode S5 are in the break-over condition, the level of the base of the triode Q1 is decreased and/or cut off, the relay RY1 is powered off, the normal open contact is open, the discharging circuit is cut off, and the batteries BT1, BT2 are not discharged.

As shown in FIGS. 28-31, a second embodiment of the anti-reverse battery device of the present disclosure differs from the first embodiment of the anti-reverse battery device because a battery-reverse-and-over-voltage protection circuit takes the place of the battery-reverse anti-discharging circuit and the first lock and shield circuit of the first embodiment.

The battery-reverse-and-over-voltage protection circuit comprises a battery-reverse- and discharging-voltage judgment circuit, a relay RY4, and a relay RY5. The output of the battery-reverse-and-over-voltage protection circuit is connected to one end of the coil of the relay RY4 and the relay RY5. The other end of the relay RY4 and the relay RY5 is connected to the discharge power. The normal open contact of the relay RY4 is connected in series to the discharging circuit and the normal open contact of the relay RY5 is connected in series between the discharge power and the power drive port of the control coil of the relay RY2, RY3.

Figure 29:
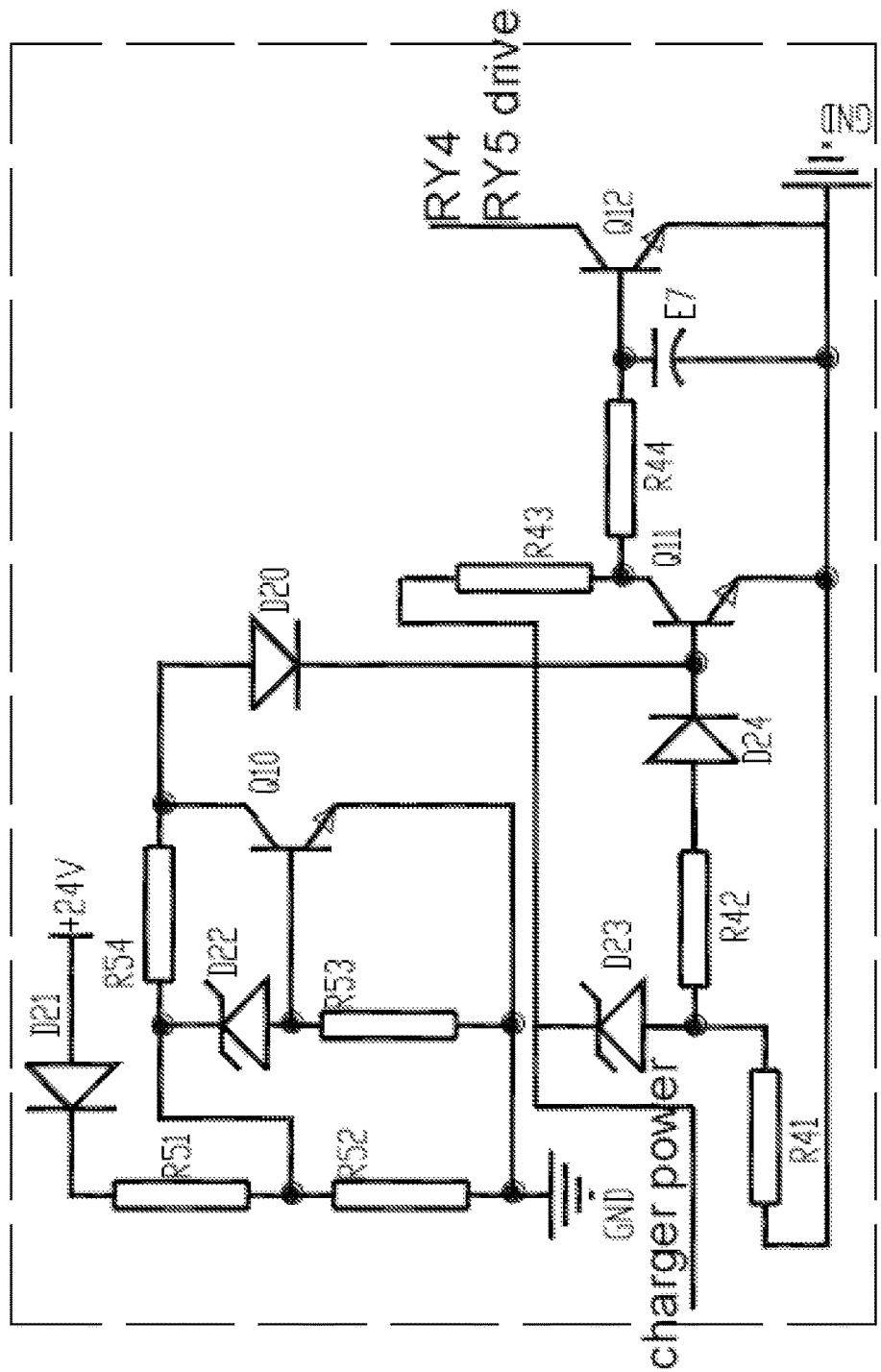
FIG. 29 is an illustrative control circuit disclosing a voltage circuit of the control circuit diagram of FIG. 28.

The battery-reverse- and discharging-voltage judgment circuit is shown in FIG. 29. When the discharge power is operating normally, the triode Q11 is cut off, the base of the triode Q12 is at a high level signal, the triode Q12 is in the break-over condition, the coils of the relays RY4, RY5 are powered, the normal open contact is closed, the discharging circuit is turned on, the relays RY2, RY3 are powered, and the batteries BT1, BT2 remain in a parallel discharged condition. If the discharging power is at a higher voltage than the stabilized voltage of the volt tube D23, the triode Q11 is in the break-over condition, the level of the triode Q12 is decreased and/or cut off, the coils of the relays RY4, RY5 lose power and release, the normal open contact is open, and the discharging circuit is cut off.

When the batteries BT1, BT2 are connected in series to the battery charging circuit, the voltage at the two ends of the batteries is 24 V. When the batteries BT1, BT2 are connected in parallel to the battery discharging circuit, the voltage at the two ends of the batteries is 12 V. As shown in FIG. 29, when the batteries are in the proper orientation and are discharging, the voltage of the batteries is 12 V, the triode Q10 is in the break-over condition, the triode Q11 is cut off, the triode Q12 is in the break-over condition, the coils of the relays RY4, RY5 are powered, the normal open contact is closed, and the batteries BT1, BT2 are maintained in the normal discharging condition. Conversely, if the batteries BT1, BT2 are reversely assembled, the voltage of the batteries is lower than 12 V, the triode Q10 is cut off, the triode Q11 is in the break-over condition, the triode Q12 is cut off, the coils of the relays RY4, RY5 lose power and release, the normal open contact is open, and the batteries BT1, BT2 cannot be discharged. In this way, damage is not caused to batteries BT1, BT2 when assembled in a reverse orientation.

When charging, if the batteries BT1, BT2 are properly oriented in the charging station, the voltage of the batteries is 24 V, the triode Q10 is in the break-over condition, the triode Q11 is in the break-over condition, the triode Q12 is cut off, the coils of the relays RY4, RY5 lose power and release, the normal open contact is open, and the batteries BT1, BT2 are maintained in the normal charging condition. Conversely, if the batteries BT1, BT2 are reversely assembled in the charging station, the voltage of the batteries is as low as 2-3 V, the triode Q10 is cut off, the triode Q11 is in the break-over condition, the triode Q12 is cut off, the coils of the relays RY4, RY5 lose power and release, the normal open contact is open, and the batteries BT1, BT2 may continue to charge because the voltage is so low, however, the probability of any risk to the batteries is reduced.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A wave-making mechanism of a pool, comprising:
   a housing with inlet holes distributed in a rear portion and a plurality of side walls;
   a motor positioned within the housing;
   an external power supply operably coupled to the motor;
   a motor control box operably connected to the external power supply;
   an impeller driven by the motor;
   an impeller housing covering the impeller and including rectifying holes;
   a guiding cap coupled to a front end of the impeller housing and having a flared configuration;
   an outlet cover coupled to a front end of the guiding cap and including a screen portion; and
   a shut-off switch that comprises a switch head magnetically coupled to the housing and including a handle and a cord.

2. The wave-making mechanism according to claim 1, wherein the housing further comprises a front portion and a bottom wall, the side walls and the bottom wall of the housing each include an opening, and an inlet side cover with a plurality of apertures is positioned at the opening of each of the side walls, and an inlet bottom cover with a plurality of apertures is positioned at the openings of the bottom wall.

3. The wave-making mechanism according to claim 2, wherein the impeller housing and the guiding cap are coupled to the front portion of the housing, and an outer edge of the front end of the guiding cap forms a flange to couple a front end of the front portion to the outlet cover.

4. The wave-making mechanism according to claim 1, further comprising a motor frame and a motor support generally surrounding the motor, and a rotating shaft of the motor is connected to the impeller through the motor support.

5. The wave-making mechanism according to claim 4, wherein the impeller housing is coupled to the motor support and the impeller is positioned therein.

6. The wave-making mechanism according to claim 1, further comprising a directional baffle disposed at a lower portion of the impeller housing and the outlet cover, and the directional baffle has an angled configuration.

7. The wave-making mechanism according to claim 1, wherein the motor control box is disposed with a sensor and a second shut-off switch configured to be positioned at an opposite end of the pool from the shut-off switch with the handle and the cord, the second shut-off switch comprising a float pipe configured to float in the pool and a sensor operably coupled to the float pipe and configured to be positioned at a wall of the pool.

8. The wave-making mechanism according to claim 1, wherein the motor control box is controlled by a remote controller.

* * * * *